US005821970A

United States Patent [19]
Sasaki et al.

[11] Patent Number: 5,821,970
[45] Date of Patent: Oct. 13, 1998

[54] COLOR IMAGE FORMING APPARATUS

[75] Inventors: Eiichi Sasaki, Sagamihara; Yutaka Shio, Yokohama, both of Japan

[73] Assignee: Ricoh Company, Ltd., Tokyo, Japan

[21] Appl. No.: 686,140

[22] Filed: Jul. 24, 1996

[30] Foreign Application Priority Data

Jul. 28, 1995 [JP] Japan .................. 7-193874

[51] Int. Cl.$^6$ .................. G03G 15/01; B41J 2/47
[52] U.S. Cl. .................. 347/116; 347/115; 347/119; 347/128; 347/232; 347/247; 347/248; 399/301; 399/302
[58] Field of Search .................. 347/115, 116, 347/119, 128, 232, 247, 248, 261; 399/301, 302

[56] References Cited

U.S. PATENT DOCUMENTS

| | | | |
|---|---|---|---|
| 4,349,847 | 9/1982 | Traino | 358/497 |
| 5,083,140 | 1/1992 | Peterson et al. | 347/248 |
| 5,083,141 | 1/1992 | Taguchi et al. | 347/261 |
| 5,153,644 | 10/1992 | Yang et al. | 347/247 |
| 5,164,783 | 11/1992 | Taguchi et al. | 399/301 |
| 5,264,870 | 11/1993 | Egawa | 347/248 |
| 5,285,221 | 2/1994 | Sumiyoshi et al. | 347/119 |
| 5,305,023 | 4/1994 | Fukushiga et al. | 347/116 |
| 5,331,341 | 7/1994 | Egawa et al. | 347/248 |
| 5,424,763 | 6/1995 | Komiya et al. | 347/116 |
| 5,444,525 | 8/1995 | Takahashi et al. | 347/116 |
| 5,457,487 | 10/1995 | Sakaki et al. | 347/116 |
| 5,541,637 | 7/1996 | Phashi et al. | 347/248 |
| 5,602,578 | 2/1997 | Sumiyoshi et al. | 347/232 |
| 5,646,749 | 7/1997 | Omi et al. | 347/115 |
| 5,648,809 | 7/1997 | Kato et al. | 347/232 |
| 5,740,492 | 4/1998 | Deki et al. | 399/301 |

*Primary Examiner*—Peter S. Wong
*Assistant Examiner*—K. Shin
*Attorney, Agent, or Firm*—Oblon, Spivak, McClelland, Maier & Neustadt, P.C.

[57] ABSTRACT

In a color image forming apparatus, a plurality of color images of component colors are combined to form a full color image. These images of the component colors are overlapped on an intermediate recording medium, and are then transferred to a transfer medium. Control circuitry reduces the amount of time required to form the component color images on the intermediate transfer medium, and to prevent an abnormality such as an out-of-phase or pull-out of a closed loop control circuit for controlling such a formation of the component color images. This may be achieved by abruptly changing a phase of a motor synchronizing signal. Further, for a period of time after the motor synchronizing signal is abruptly changed, a gain of an amplifier in the motor control circuit can be reduced, an abnormality detection in the motor control circuit can be reduced, the motor control circuit can be placed in an open loop state, or an addition or subtraction signal can be input to the closed loop motor control circuit. This specified period can also be detected based on a feedback including a rotational phase of a polygon motor formed as part of a unit for writing the individual component color image signals.

18 Claims, 30 Drawing Sheets

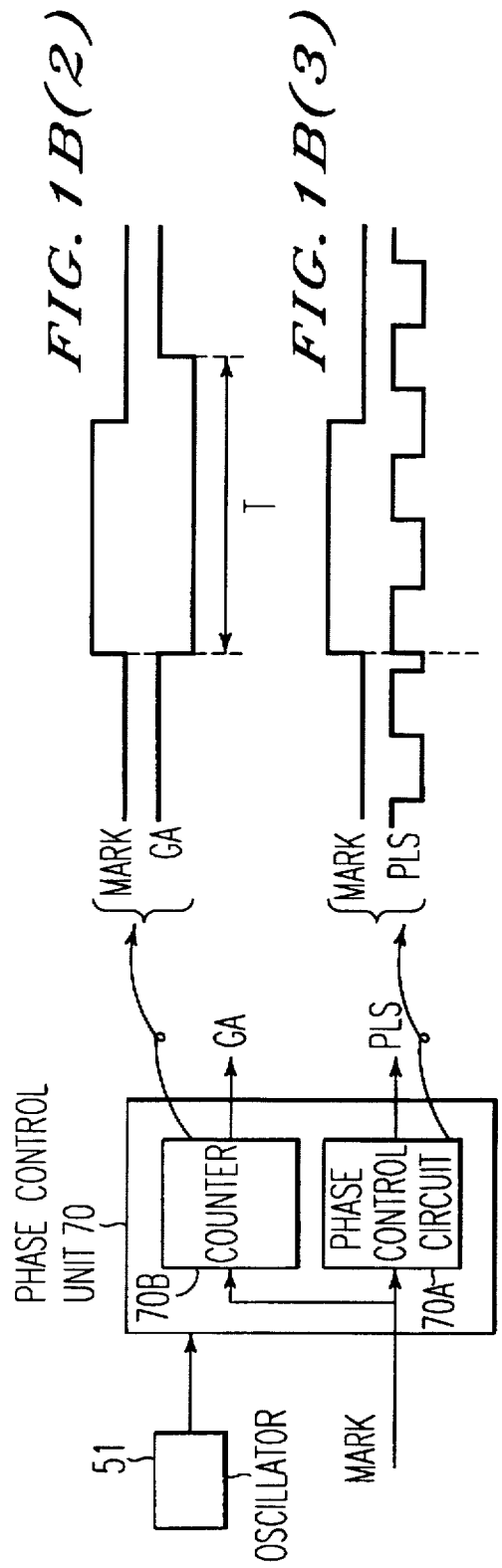
FIG. 1B(2)
FIG. 1B(3)
FIG. 1B(1)
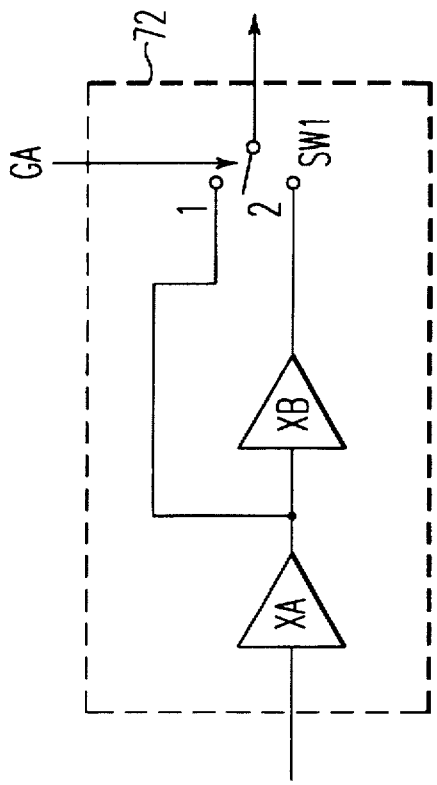
FIG. 1C

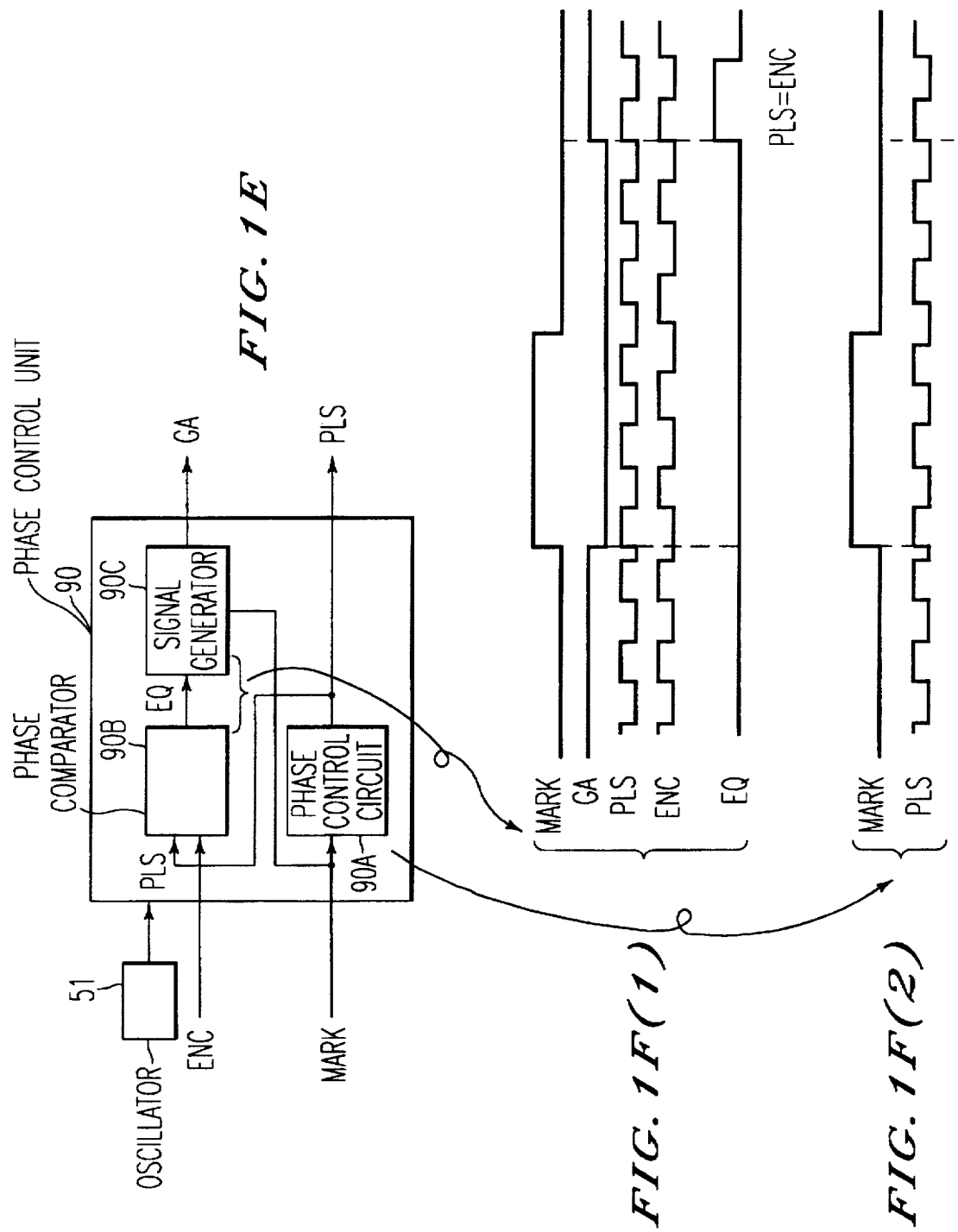

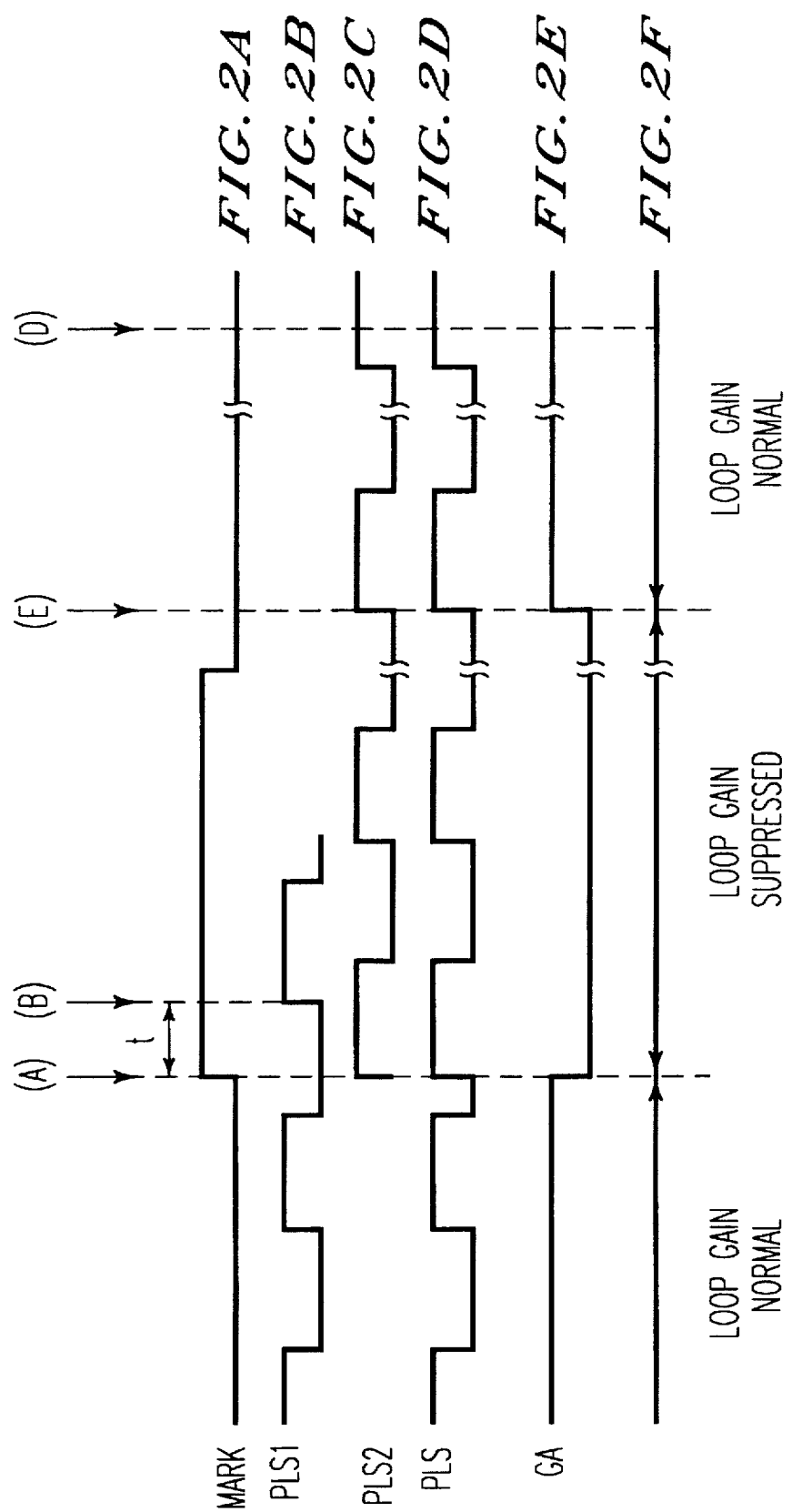

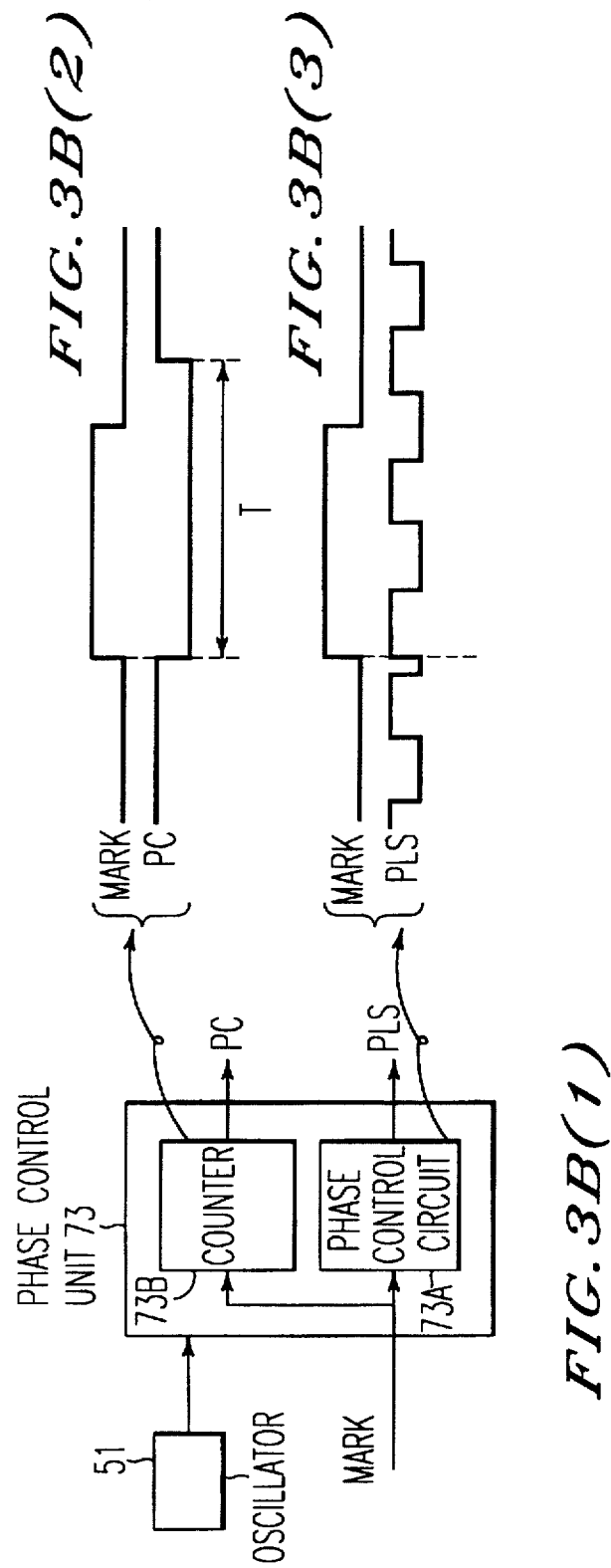

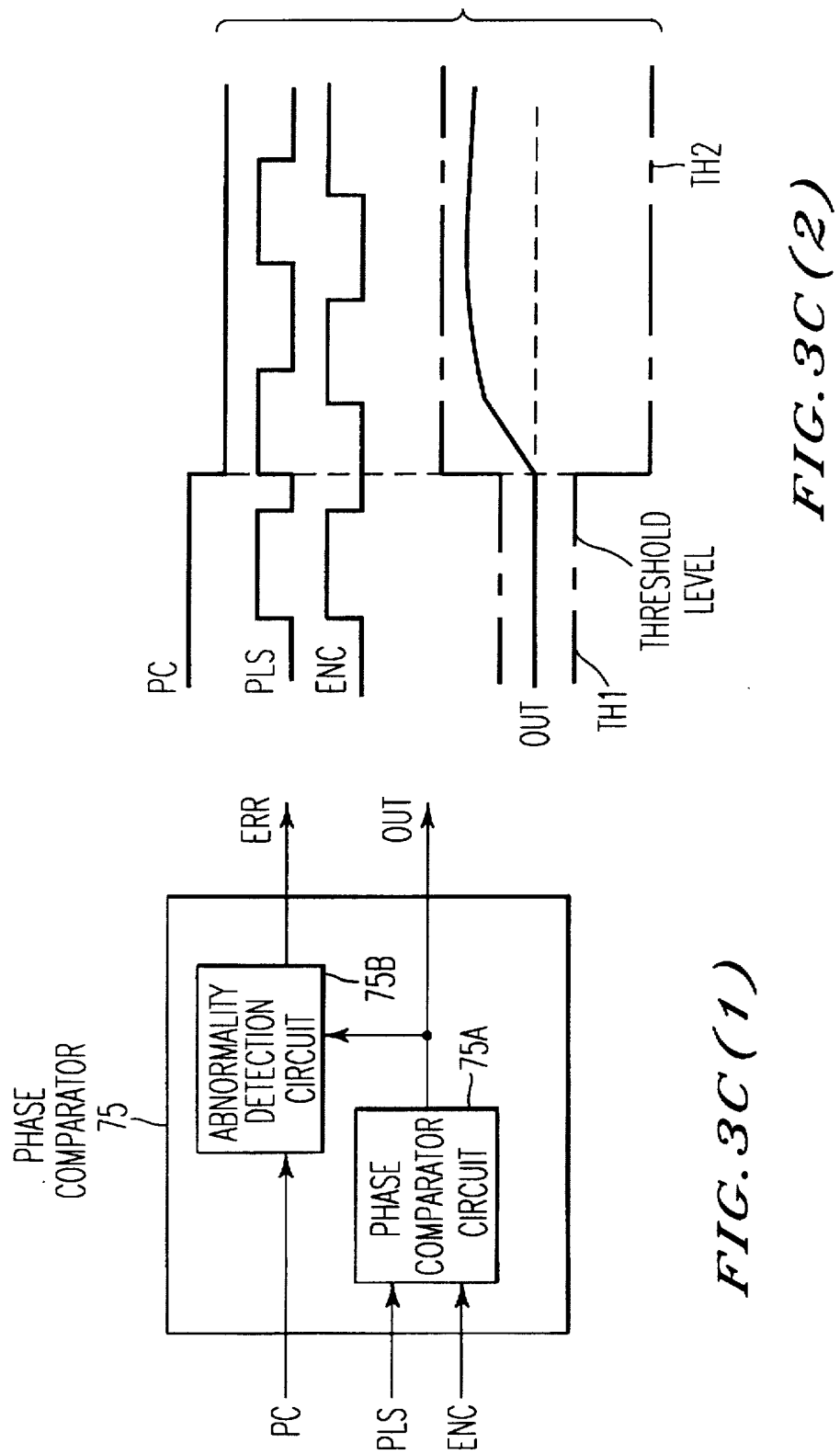

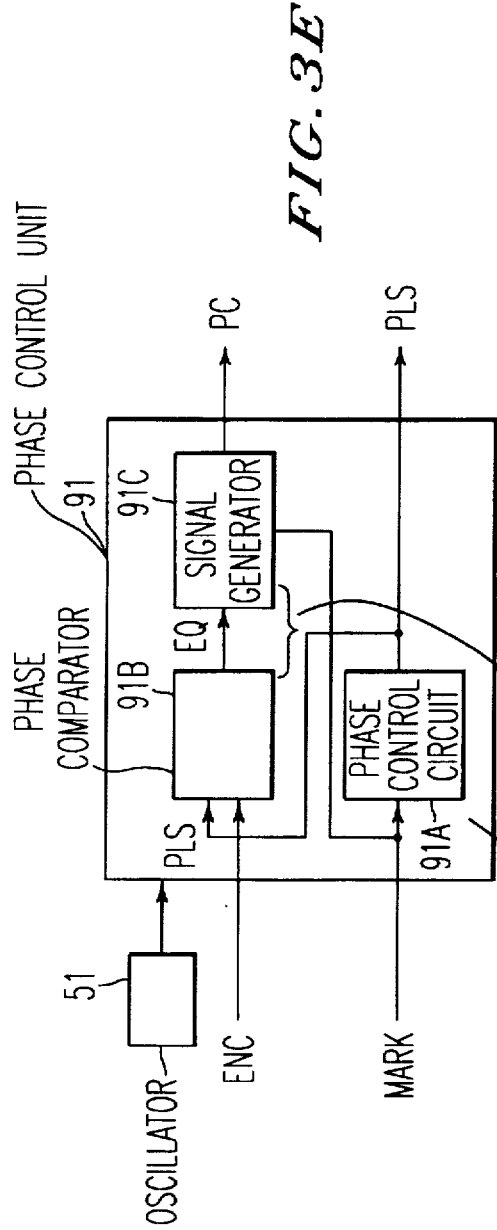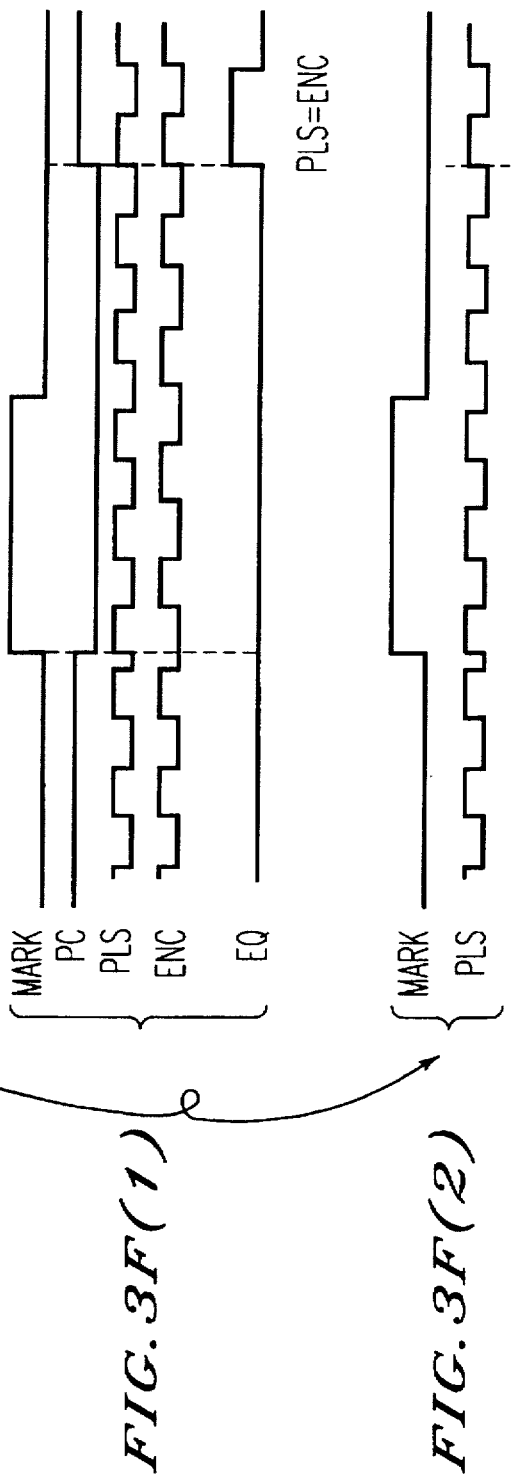

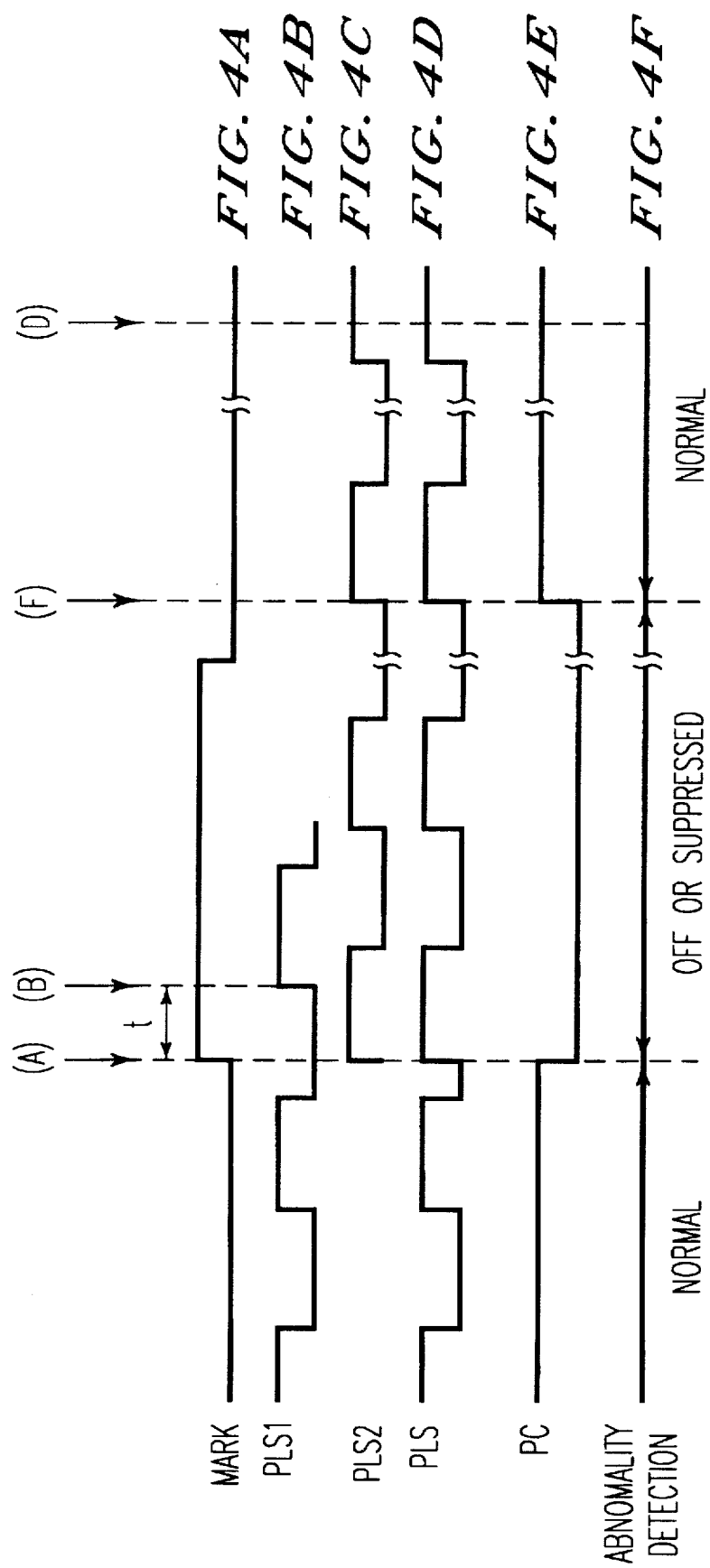

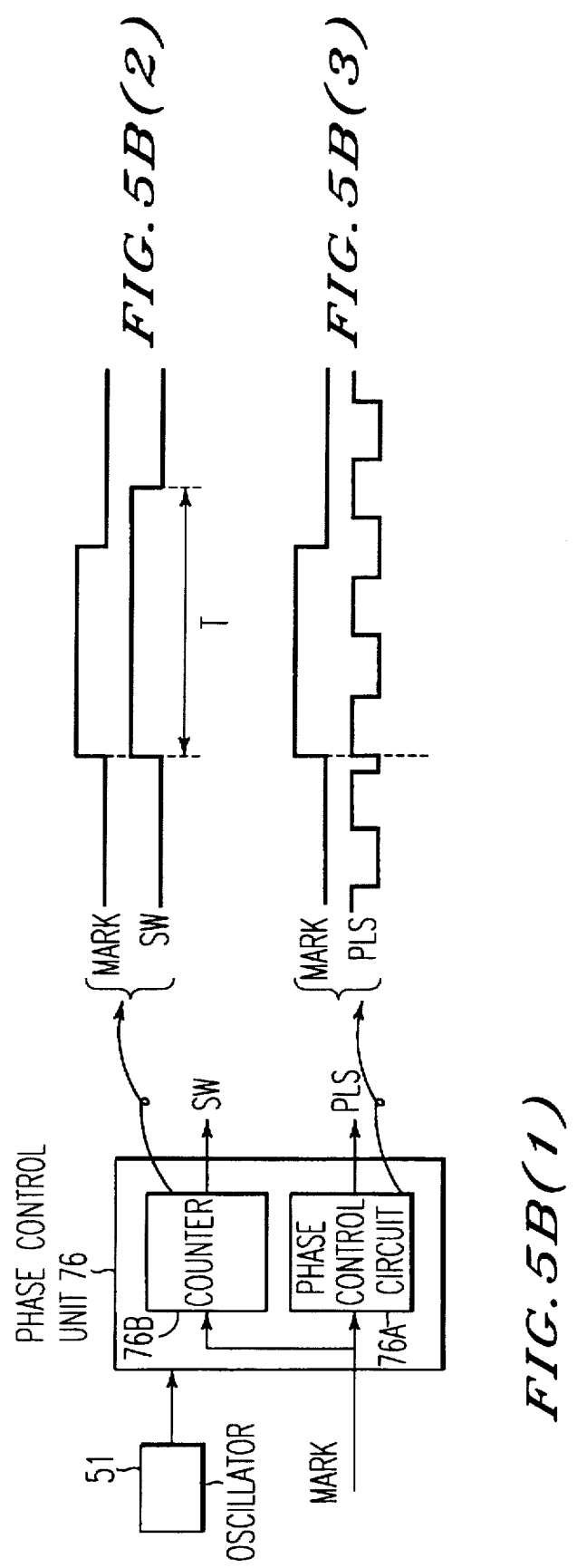

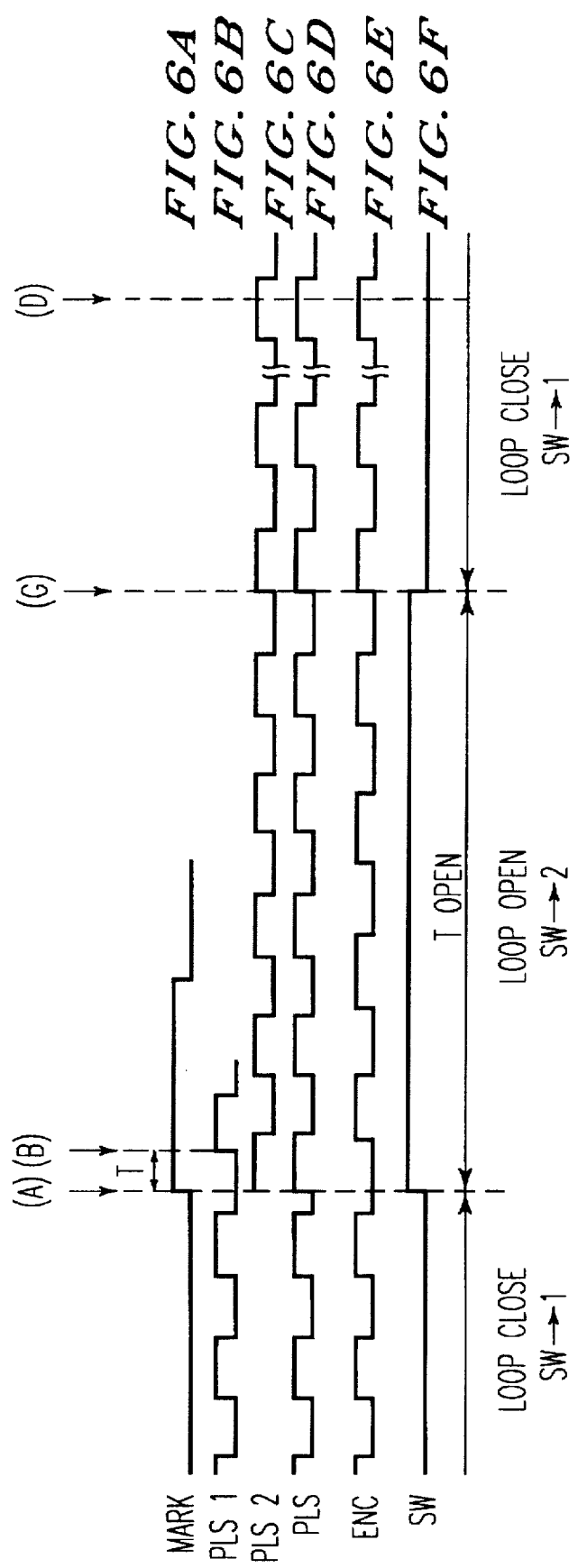

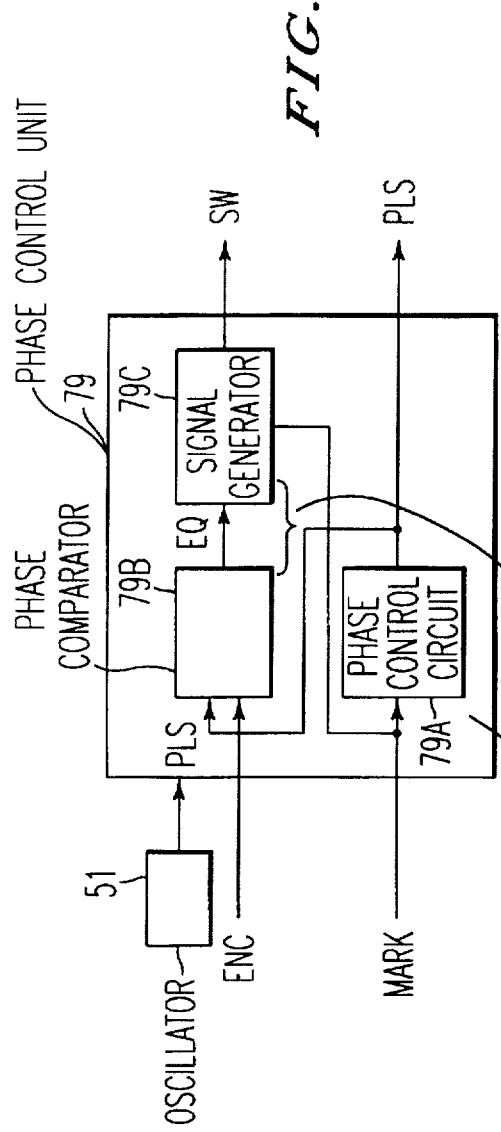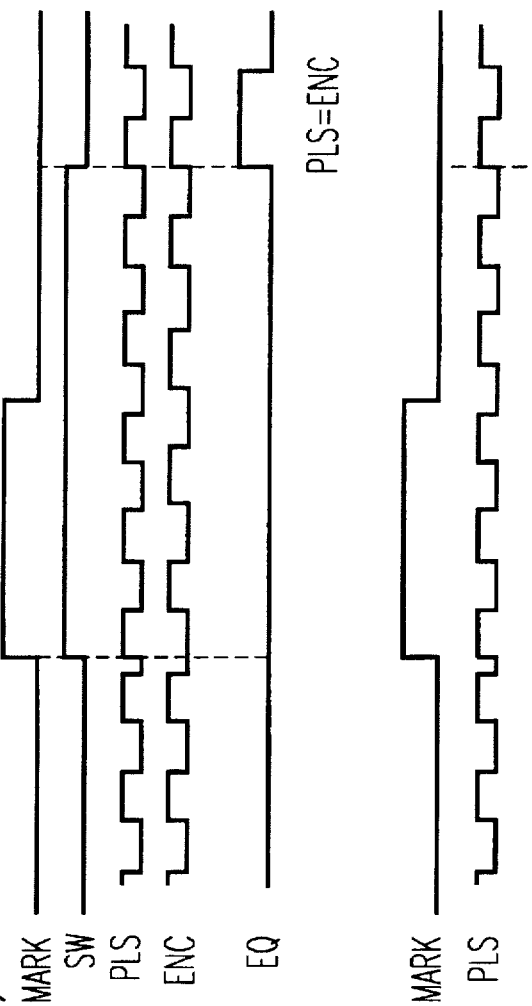

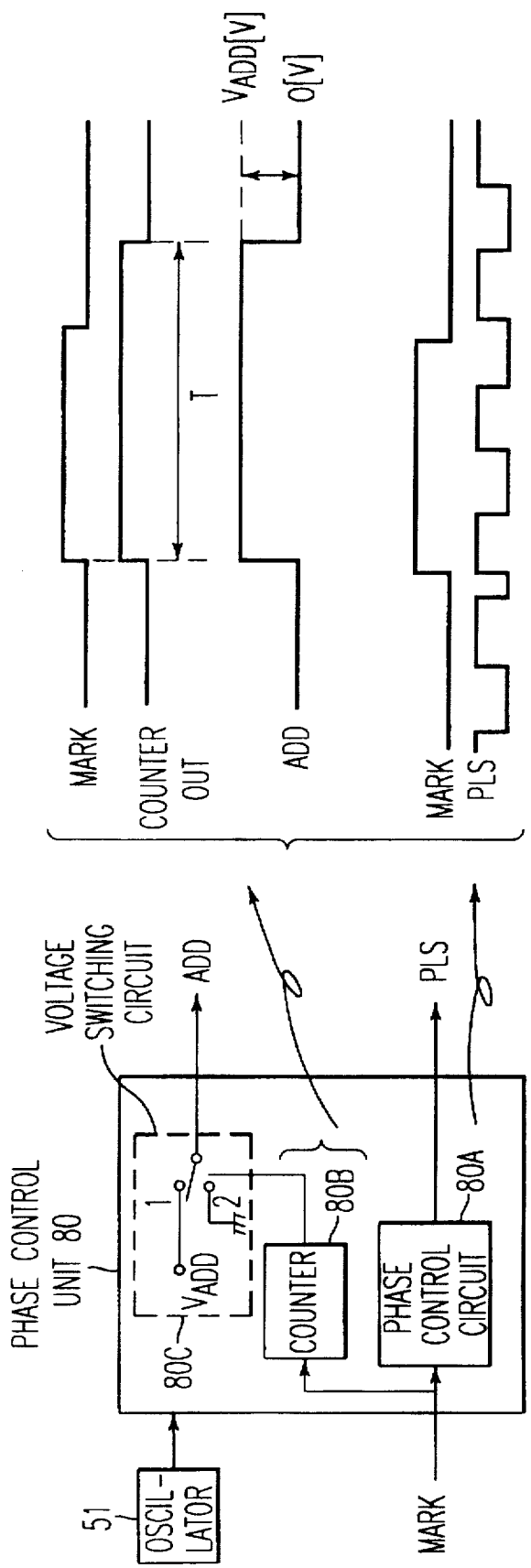
FIG. 9B(1)
FIG. 9B(2)
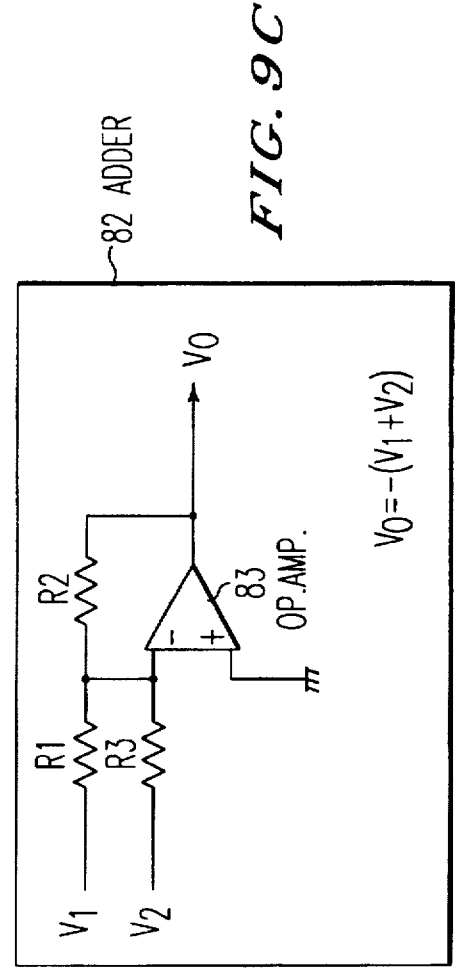
FIG. 9C

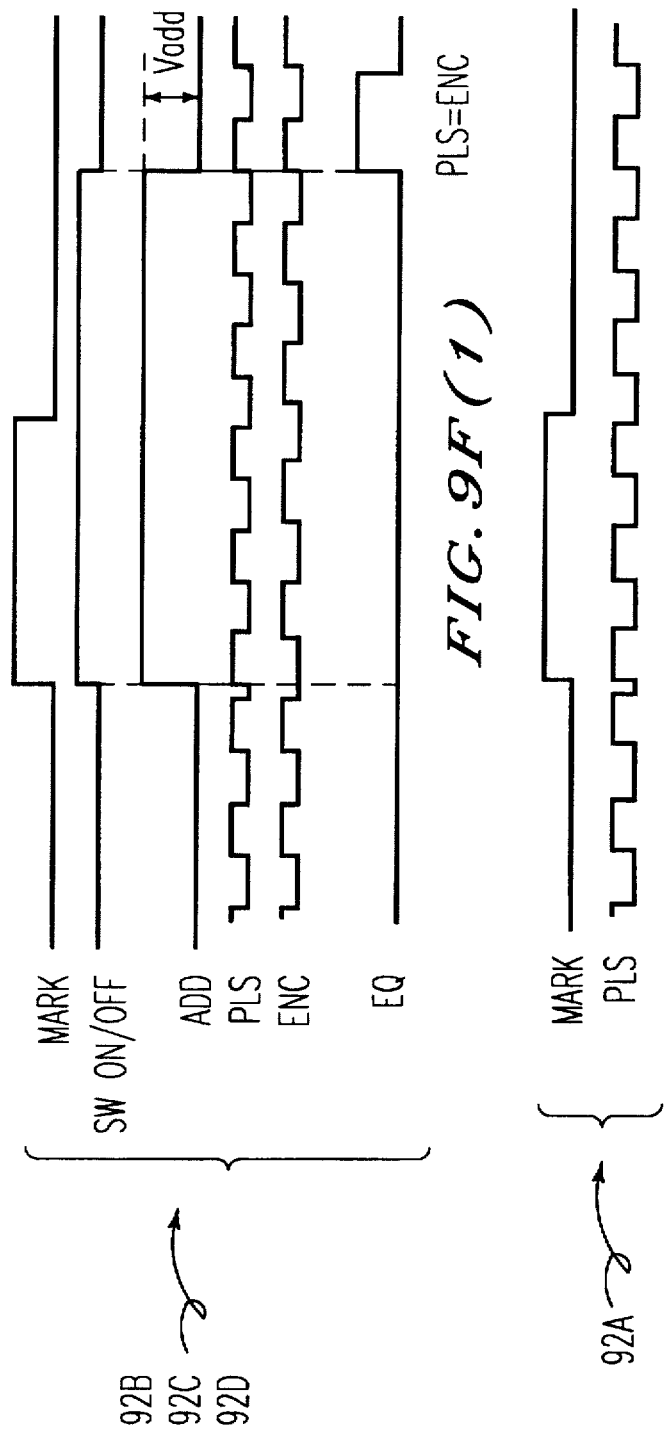

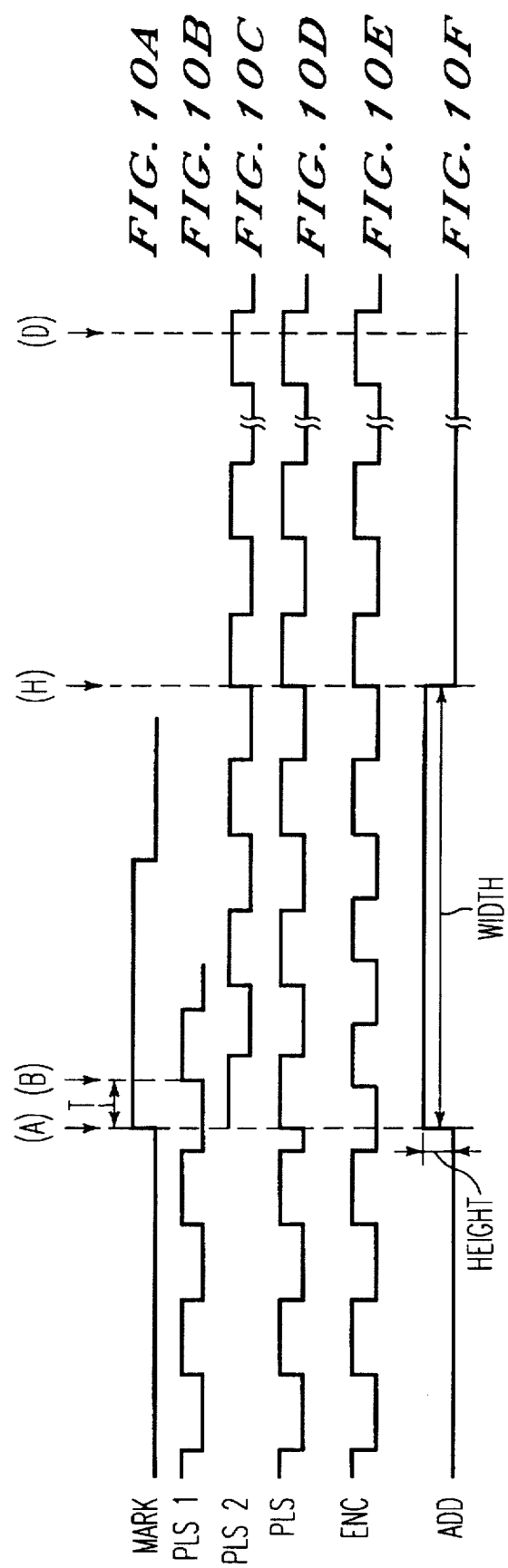

COLOR IMAGE FORMING APPARATUS

BACKGROUND OF THE INVENTION

1. Field of the Invention

This invention relates to a color image forming apparatus, such as a color copier, color printer, color facsimile apparatus, and other similar color image forming apparatus.

2. Discussion of the Background

A color image forming apparatus may be structured as a color copier, color printer, color facsimile apparatus, and the like. FIG. 13 shows an example of a color printer. In FIG. 13, a belt type image carrier/supporter includes a flexible photosensitive belt 1. The photosensitive belt 1 is installed between rotatable rollers 2 and 3, and is driven by the rotatable roller 2 and rotated in a subscanning (clockwise) direction.

A charge member 4 includes a charge roller as a charging element. A laser writing unit 5 operates as an image exposing unit. Rotatable developing units 6 to 9 include a plurality of developing units which respectively contain developing agents of different colors. The laser writing unit 5 is contained in a supporting cage with an opening for exposure of a slit type installed on an upper surface.

For the laser writing unit 5, in addition to the illustrated optical system, an emitter with a convergent photoconductor and the like are used. The charge member 4, which is positioned where a laser writing beam 5D of laser writing unit 5 is emitted to the photosensitive belt 1, and a cleaning apparatus 15 for cleaning the photosensitive belt are installed in close proximity to roller 2 on which the photosensitive belt 1 is installed.

Each of developing units 6, 7, 8 and 9 contains a respective developing agent, for example, of yellow, magenta, cyan and black colors respectively, and each includes a developer carrying and supporting member having a developing roller in close proximity to or contacting the photosensitive belt 1 at a specified position. Developing units 6–9 have a function to develop an electrostatic latent image on the photosensitive belt 1 by a non-contacting method or by a contacting method for developing. An intermediate transfer body 10 is a transfer image carrier/supporter, and is installed between the rotatable rollers 11 and 12, and includes an intermediate transfer belt which rotates counterclockwise.

The photosensitive belt 1 contacts the intermediate transfer belt 10 at a position of the rotatable roller 3. A monochrome image of one color first formed on the photosensitive belt 1 is then transferred to the intermediate transfer belt 10 by applying a transfer bias from a high-voltage power source to a bias roller 13 contacting an inner side of the intermediate transfer belt 10. Similarly, monochrome images in each of the other colors are secondly, thirdly and fourthly formed on the photosensitive belt 1, and are then transferred to the intermediate transfer belt 10 so that they can be overlapped with the firstly formed monochrome image without misregistration.

A transfer roller 14 is installed so that it can contact and/or be separated from the intermediate transfer belt 10 with a contacting/separating function. A cleaning apparatus 16 for cleaning the intermediate transfer belt is also provided, and blade 15A of this cleaning apparatus 16 is kept at a position separated from a surface of intermediate transfer belt 10 during image formation with the contacting/separating function, and is pressed to contact the surface of intermediate transfer belt 10 (as illustrated) only during cleaning after image transfer.

This color printer forms color images as follows. Firstly, a process for multiple color image formation by using this color printer is executed as follows. Specifically, original images are scanned by an image reading apparatus (image scanner) independent of the color printer, are read by an image sensing device, and then the read color image data are processed by an image data processing section, which generates image data for each of various colors, namely image data of yellow, magenta, cyan and black colors respectively. The image data is then stored in an image memory.

Secondly, the image data of each of the four colors are read from the image memory and input into the laser writing unit 5 as image forming signals for each of the four colors. Specifically, the image data for each of the four colors output from the image reading apparatus independent of this color printer are input into the laser writing unit 5 through an image data processing section.

In the laser writing unit 5, driving apparatus 5A for driving rotatable polygonal mirror 5B includes a drive motor which causes the rotatable polygonal mirror 5B to rotate, and the image data for each of the four colors sequentially input from the image reading apparatus through the image data processing section causes a semiconductor laser to be modulated and driven to generate a laser beam 5D with a strength variable according to the image data of each color. This laser beam 5D is deflected and scanned by rotatable polygonal mirror 5B, and is emitted on the surface of an outer circumference of photosensitive belt 1 through an optical path through mirror 5G and f-theta lens 5C.

The photosensitive belt 1, which has been entirely charged by charge roller 4, is discharged with the discharge lamp 21, and is then exposed with the laser beam 5D reflected off mirror 5G, which sequentially forms electrostatic latent images corresponding to the image signals for each of the four colors. The application of bias from a high-voltage power source to the charge roller 4, causes the photosensitive belt 1 to be wholly charged, and the image pattern exposed on the photosensitive belt 1 with the laser writing unit 5 is a monochrome image pattern when color-separating the specified full-color image into the respective colors of yellow, magenta, cyan and black.

The electrostatic latent images corresponding to the image signals in each of the four colors sequentially formed on the photosensitive belt 1 are then developed by each of the yellow, magenta, cyanic and black developing units 6, 7, 8 and 9, respectively, which forms monochrome images in each of the above colors. When forming an electrostatic latent image corresponding to a yellow image signal on the photosensitive belt 1, yellow developing unit 6 is moved to a developing position and develops the yellow electrostatic latent image, which makes a yellow monochrome image. Similarly, when forming the electrostatic latent images corresponding to the image signals in each of the magenta, cyan and black colors on the photosensitive belt 1, each of the other developing units 7, 8 and 9 is moved to the developing positions to develop each of the magenta, cyan and black electrostatic latent images, which forms monochrome images of magenta, cyan and black colors respectively.

The transfer bias is applied from a high-voltage power source through the bias roller 13 to the intermediate transfer belt 10, and the monochrome images for each of the yellow, magenta, cyan and black colors sequentially formed on the photosensitive belt 1 are sequentially overlapped and transferred to the counterclockwise rotating intermediate transfer belt 10. Overlapping the monochrome images in each of the yellow, magenta, cyan and black colors on and transferring the overlapped images to the intermediate transfer belt 10 forms a full-color image on intermediate transfer belt 10. Then, transfer paper is fed from a paper feeding base 17 through feeding roller 18 and registration roller 19 to a transfer section, where the full-color image is transferred to the transfer paper by the transfer roller 14.

The transfer paper is then discharged into the tray 23 after the full-color image has been fixed in the fixing apparatus 20, causing the completion of the full-color image. The intermediate transfer belt 10 and the photosensitive belt 1 are seamless. The photosensitive belt 1 is cleaned by cleaning apparatus 15 after the monochrome images for each of the yellow, magenta, cyan and black colors have been transferred to the intermediate transfer belt 10, and the intermediate transfer belt 10 is cleaned by cleaning apparatus 16 after the full-color image has been transferred to the transfer paper.

FIG. 14 is an enlarged schematic view outlining a portion of the color printer of FIG. 13.

Six marks 41A, 41B, 41C, 41D, 41E and 41 are formed at regular intervals on an other surface of the intermediate transfer belt 10, and a mark detecting sensor 40 detects the marks 41A through 41F on the intermediate transfer belt 10 at a downstream side of a direction of rotation of the intermediate transfer belt 10. The mark detecting sensor 40 is a reflection type photosensor which may be formed of a reflection type photo-interrupt.

The mark detecting sensor 40 detects any one of the six marks 41A through 41F, for example the mark 41A, and the laser writing unit 5 starts to write a first color image (e.g., corresponding to the yellow image signal) on the photosensitive belt 1 based on an output of mark detecting sensor 40. When the mark detecting sensor 40 detects again the mark 41A after mark 41A makes one rotation, the laser writing unit 5 starts to write a second color image (e.g., corresponding to the magenta color image signal) on the photosensitive belt 1.

At this time, the detected signals corresponding to the marks 41B through 41F of the mark detecting sensor 40 are covered by a mask so that they cannot be used as a timing to write the images according to the management on the number of marks detected with the mark detecting sensor 40. A concentration detecting element 22 including a P sensor is installed on an opposite side in an upstream side of a direction of rotation of the photosensitive belt 1 from a touching section with the intermediate transfer belt 10, and optically detects a volume of the toner on the photosensitive belt 1.

FIG. 15 is a schematic view outlining a portion of the color printer of FIG. 13 including from the laser writing unit 5 to the mark detecting sensor 40.

The color printer includes a motor control circuit 52 to control driving of polygon mirror 5B. When a color signal output by an image reading apparatus independent of this color printer is output to the laser writing unit 5, in the laser writing unit 5, semiconductor laser 5E generates laser beam 5D having a strength according to the color signal by modulating and driving the laser 5E according to the color signal. This laser beam 5D is rotated and scanned in the main scanning direction by the rotatable polygonal mirror (hereinafter "polygonal mirror") 5B.

Polygonal mirror 5B is rotated based on a control signal from motor control circuit 52. The laser beam 5D is then emitted on the photosensitive belt 1 through an optical path through mirror 5G and f-theta lens 5C. At this time, the laser beam 5D scanned to the main scanning direction by the polygonal mirror 5B is detected with the synchronizing detecting sensor 5F before being emitted on the photosensitive belt 1 in a main scan, and the output signal of this synchronizing detecting sensor 5F is used as a synchronizing signal in the main scanning direction of image writing. The polygon motor 5A is rotated by synchronizing to the motor synchronizing signals, and the phase of this motor synchronizing signal is synchronized with a phase of rotating the polygon motor 5A. The polygonal mirror 5B has eight faces, and the synchronizing signal of polygonal mirror 5B has two pulses per rotation.

FIG. 16 shows a further portion of this color printer of FIG. 13.

A phase matching circuit 50 is a circuit to which the mark detecting signal from the mark detecting sensor 40 and a clock signal from an oscillator 51 are input. The clock signal from the oscillator 51 as an original signal is divided in phase matching circuit 50, and is output as a motor synchronizing signal PLS. The rotation speed and rotation phase of polygon motor 5A are controlled with the motor synchronizing signal PLS from the phase matching circuit 50 at motor control circuit 52.

In this color printer, a signal dividing the clock from the oscillator 51 by sixty four (64) may become the motor synchronizing signal PLS. In other words, if the clock cycle of oscillator 51 is tc, a cycle tp of motor synchronizing signal 51 will be tp=64xtc. The phase matching circuit 50 detects a rising edge of the detecting signal from the mark detecting sensor 40 as its rotating synchronizing trigger, and changes the phase of motor synchronizing signal PLS to reestablish the rotation phase of the polygon motor 5A based on this signal.

FIG. 17 is a timing chart for the operation of the color printer of FIGS. 13–16.

In FIG. 17, the term "regular period" refers to a period during which ordinary image exposure is executed, the term "counting period" refers to a period to count a phase difference between the phase of a preceding image motor synchronous signal PLS1 used for formation of a preceding color image (the rotation phase of polygon motor 5A) and a phase of the mark detecting signal from the mark detecting sensor 40, and the term "phase matching period" refers to a period to shift the phase of the motor synchronizing signal PLS to the phase of the regular period on the basis of the count value during the counting period.

The term "counting period" also refers to a period from a leading edge a of the mark detecting signal to a first leading edge b to count the clock from the oscillator 51 during the counting period by the counter. If the last count value CNT during the counting period by the counter is time t, CNT will be CNT=t/tc. The motor synchronizing signal switches to the phase synchronized pulse signal starting at the timing b in the phase matching period. The cycle of this phase synchronized pulse signal has a relation of td=tp−tc.

The term "phase matching period" refers to a period until the timing c during which the motor synchronizing signal PLS appears as the count value CNT only of the counting period, and after the phase matching period has elapsed, the phase of the phase synchronized pulse signal synchronizes to the phase of a next motor synchronizing signal PLS2 used for the formation of a next color image. The cycle td of the phase synchronized pulse signal has a relation of td<tp. In the phase matching period the motor synchronizing pulse signal PLS is controlled in a direction in which the phase runs after the target phase (the constant phase condition of the motor synchronizing signal PLS synchronized to the mark 41A detecting timing of the mark detecting sensor 40). In the timing c, the motor synchronizing signal PLS switches to the next motor synchronizing signal PLS2 in the constant period.

The polygon motor 5A is driven and controlled at the position of polygon motor control circuit 52 with the motor synchronizing signal PLS. The number of marks 41 detected by the mark detecting sensor 40 from the leading edge a of the mark detecting signal is counted, the write leading signal is started by reaching the count value to the set up value n, and by synchronizing starting the write leading signal the image exposure begins with the next color image data by the laser writing unit 5. Needless to say, the phase matching period is terminated within the period to count the number of marks detected by the mark detecting sensor 40 until the time of counting it to the set up value n.

FIG. 11 shows a further detail of a portion of this color printer of FIG. 13 and FIG. 16. The phase matching circuit 50 is a digital synchronizing circuit operating by synchronizing with the clock signal output from the oscillator 51, and as stated above, the mark detecting signal from the mark detecting sensor 40 causes the phase of the motor synchronizing signal PLS to the motor control circuit 52 to be variable according to the mark detecting timing of the mark detecting sensor 40. At this time, changing the phase matching circuit 50 sharply causes the phase synchronization of the motor control circuit 52 to deviate sharply. For this reason, the phase of the motor synchronizing signal PLS is gradually varied by making the phase of the motor synchronizing signal PLS gradually delay or advance. The motor control circuit 52 controls the polygon motor 5A to follow the motor synchronizing signal PLS from the phase matching circuit 50.

In the motor control circuit 52, the phase of the motor synchronizing signal PLS from the phase matching circuit 50 is compared with the phase of an output signal of a sensor 5H, and a phase lock loop (PLL) circuit is controlled so that its phase difference can be a specified value. The sensor 5H is arranged around the polygon motor 5A, and detects the rotation phase of the polygon motor 5A, and includes an encoder to output an output signal showing the rotation phase of the polygon motor 5A. An amplifier/waveform shaper 63 amplifies the output signal of the sensor 5H, shapes its waveform to be binary and to make a pulse type signal, and outputs this signal to the phase comparator 60 as an encoder signal ENC indicating the rotation phase of polygon motor 5A.

The phase comparator 60 compares the phase of the motor synchronizing signal PLS from the phase matching circuit 50 with the phase of output signal ENC of the amplifier/waveform shaper 63, and the results of the phase comparison is smoothed by the low-pass filter (LPF) 61, and then is input to the amplifier 62. The amplifier 62 controls the current to the polygon motor 5A according to the output signal of LPF 61, and causes the polygon motor 5A to rotate and drive polygonal mirror 5B.

In such a manner, the motor control circuit 52 is a PLL circuit including a closed loop, and controls the polygon motor 5A to make the rotation phase of the polygon motor 5A follow the motor synchronizing signal PLS from the phase matching circuit 50. The rotation phase of the polygon motor 5A in turn controls the rotation phase of the polygonal mirror 5B.

FIG. 12 is a timing chart showing the operation of signal processing conducted in the phase matching circuit 50. The phase matching circuit 50 first outputs the motor synchronous signal (for a preceding color image) PLS1. When the mark detecting signal MARK is input from the mark detecting sensor 40 at the timing (a), detecting a rising edge of this mark detecting signal MARK causes the phase matching circuit 50 to generate the motor synchronous signal (for a subsequent-color image) PLS2. The phase of the motor synchronizing signal PLS is immediately shifted from the motor synchronous signal of the preceding color image PLS1 to the motor synchronous signal of the subsequent color image PLS2, which causes the PLL circuit 52 to produce a phase deviation.

The phase matching circuit 50, therefore, establishes the phase matching period, and gradually deviates the phase of motor synchronizing signal PLS so that PLL circuit 52 does not generate any pull out. The phase matching circuit 50 matches the phase of motor synchronizing signal PLS by outputting a pulse signal PLS3 shorter than a cycle of the usual motor synchronizing signal (phase synchronized pulse signal) to the PLL circuit 52 according to the time of gap t between the detecting timing (a) of mark detecting signal MARK and the rising edge (b) of motor synchronizing signal PLS1 as illustrated in FIG. 12.

The PLL circuit 52 operates to follow the motor synchronizing signal PLS2 after the timing (c) of the completion of the phase matching period. Finally, the signal output from the phase matching circuit 50 to the PLL circuit 52 is a signal matching the motor synchronizing signal PLS. The timing (d) is a timing to start writing images on the photosensitive body 1 with the laser writing unit 5, and writing images on the photosensitive body 1 with the laser writing unit 5 begins after a specified time has elapsed from the time when the mark detecting signal MARK was detected at the position of phase matching circuit 50.

In such a manner, by controlling the rotation phase of polygon motor 5A, the rotation phase of the polygon motor 5A and the polygonal mirror 5B can usually be kept in a stable condition. Because the above controlling is applied to writing images in each of the colors, highly precise overlapping of the various color images is achieved without any dislocation of exposure in the subscanning direction, which allows obtaining color images without any color shear.

However, in the color printer mentioned as above, sharply changing the phase of the motor synchronizing signal PLS from the motor synchronous signal PLS1 of the preceding color image to the motor synchronous signal PLS2 of the subsequent color image by detecting a rising edge of the mark detecting signal MARK may cause the PLL circuit 52 to generate an abnormality such as an out-of-phase and pull out. Thereby, the phase matching period is set up by the phase matching circuit 50, and the phase of the motor synchronizing signal PLS gradually deviates over this phase matching period.

However, this phase matching period is relatively long, and thus significantly reduces the speed at which a full color copy can be formed. This phase matching period may be on the order of 0.5 seconds for each color, or two seconds for a full color image.

SUMMARY OF THE INVENTION

Accordingly, it is an object of the present invention to provide a novel color image forming apparatus to enable shortening the time needed for changing a phase of a motor synchronizing signal, and to thereby smoothly change a phase of a rotatable polygonal mirror.

These benefits of the present invention allow printing to be achieved at a higher speed. Such benefits of the present invention may also allow a shorter intermediate transfer belt to be utilized, which thus would still allow even further higher speed operation.

The benefits are achieved in the present invention by implementing in a novel color image forming apparatus operations and procedures to prevent an abnormality such as an out-of-phase or pull-out from being generated in a motor control circuit formed as a closed loop. In the present invention, a motor synchronizing signal is abruptly changed upon the detection of a MARK signal. Under normal procedures, such an abrupt change of a motor synchronizing signal would result in an abnormality such as an out-of-phase or a pull-out of a closed loop motor control circuit. However, the present invention implements operations and procedures to prevent such an abnormality of an out-of-phase and pull-out from occurring.

According to one feature of the present invention, a gain of an amplifier of the closed loop motor control circuit is reduced at the time the motor synchronizing signal is abruptly changed. The period of time that the gain of the amplifier is reduced is much less than a phase matching period in the background device, and thus the overall time for forming a color image from a plurality of individual color can be reduced. Further, such a structure in the present invention prevents an abnormality of an out-of-phase and pull-out in the closed loop motor control circuit from occurring.

The present invention can also achieve such objectives by reducing the ability of a phase comparator to detect an abnormality condition for a specified period after the phase of the motor synchronizing signal is abruptly changed.

The objectives of the present invention can also be achieved by placing the closed loop motor control circuit in an open loop state for a specified time period after the motor synchronizing signal is abruptly changed.

The objectives of the present invention can also be achieved by generating an adding signal or subtracting signal supplied to an amplifier in the closed loop motor control circuit, which thereby either speed up or reduce the rotational speed of a polygon motor driven by the motor control circuit for a specified period of time after the motor synchronizing signal is abruptly changed.

Moreover, these operations in the present invention can also be controlled so that the specified period of time is determined by detecting a feedback signal indicating a rotational phase of a polygon motor which is driven by the motor control circuit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 1A–1C show portions of a first embodiment of the present invention;

FIGS. 1(D)–1F(2) show portions of a modification of the first embodiment of the present invention;

FIGS. 2A–2F is a timing chart showing an operational timing of the first embodiment;

FIGS. 3A–3C(2) show portions of a second embodiment of the present invention;

FIGS. 3D–3F(2) show portions of a modification of the second embodiment of the present invention;

FIGS. 4A–4F is a timing chart showing an operational timing of the second embodiment;

FIGS. 5A–5B(5) show portions of a third embodiment of the present invention;

FIGS. 6A–6F is a timing chart showing an operational timing of the third embodiment;

FIGS. 7A–7C(2) show portions of a fourth embodiment of the present invention;

FIGS. 9A–9C show portions of a fifth embodiment of the present invention;

FIGS. 9D–9F(2) shows portions of a modification of the fifth embodiment of the present invention;

FIG. 10 is a timing chart showing an operational timing of the fifth embodiment;

DESCRIPTION OF THE PREFERRED EMBODIMENTS

Figure 1A:
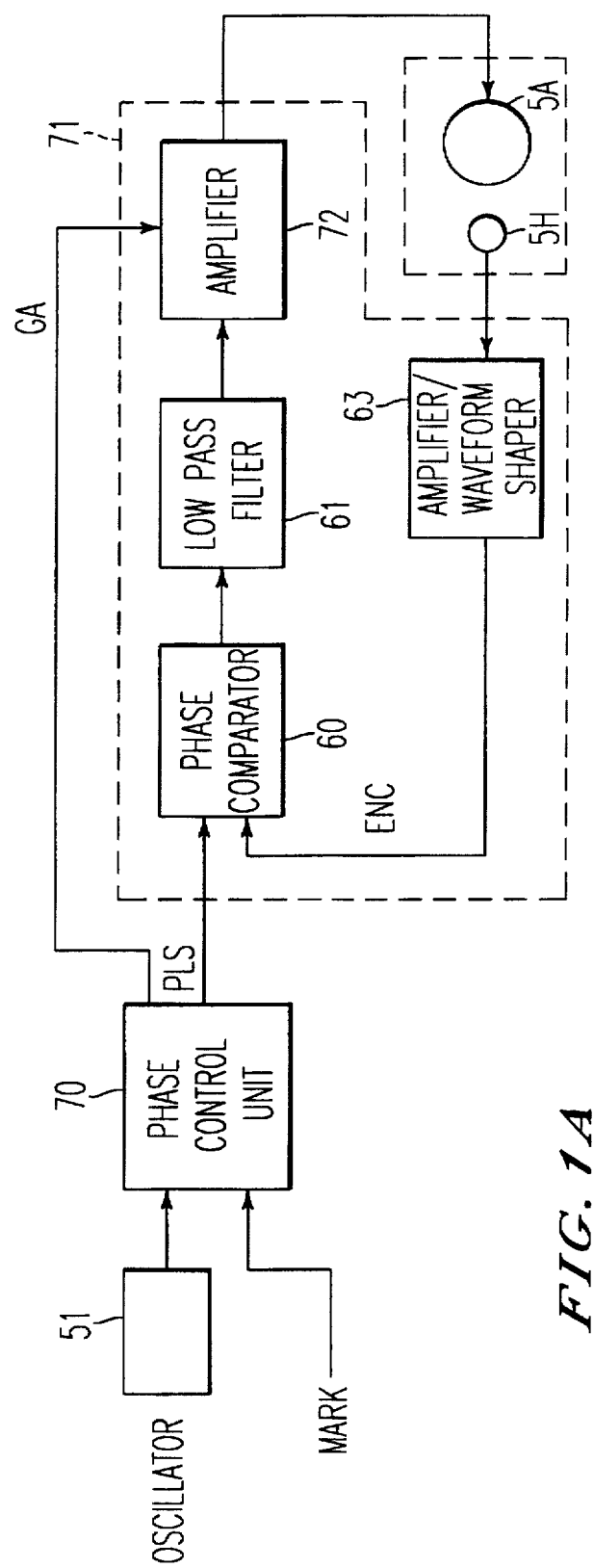

Referring now to the drawings, wherein like reference numerals designate identical or corresponding parts throughout the several views, and more particularly to FIG. 1 thereof, FIG. 1A shows a portion of a first preferred embodiment according to the present invention.

In this color image forming apparatus of FIG. 1A, a phase control unit 70 and a motor control circuit 71 are used as shown in FIG. 1A. The motor control circuit 71 forms a part of a closed loop which also includes an amplifier 72 in which a rate of amplification (gain) can be switched, which differs from amplifier 62 in the motor control circuit 52 of FIG. 11.

In this first embodiment, a method of gradually deviating a rotation phase of the polygon motor 5A as discussed above in the background art is not applied. In this embodiment of the present invention, the rotation phase of the polygon motor 5A is changed sharply. As a result, there is a possibility of generating an abnormality of an out-of-phase and pull out in the motor control circuit 71. However, in this embodiment of the present invention, positive appropriate measures and taken in changing the phase of polygon motor 5A so that there is no abnormality of an out-of-phase and pull out in the motor control circuit 71.

Specifically, in this first embodiment of the present invention, the phase control unit 70 generates a switching signal GA which is output to amplifier 72 of motor control circuit 71 The use of this switching signal GA controls the motor control circuit 71 so that no abnormality of an out-of-phase or pull out is generated.

FIGS. 2A–2F is a timing chart showing an operational timing according to the first embodiment of the present invention. A mark detecting signal MARK from a mark detecting sensor 40 and a clock signal from oscillator 51 are input to phase control unit 70, from which a motor synchronizing signal PLS is output after dividing the clock signal from the oscillator 51 as a source signal. The phase control unit 70 firstly generates the motor synchronizing signal (preceding color image) PLS1.

When the mark detecting signal MARK is input from the mark detecting sensor 40 at the timing (a) to the phase control unit 70, the phase control unit 70 generates the motor synchronizing signal (subsequent color image) PLS2 by detecting the rising edge of the mark detecting signal MARK, and changes the motor synchronizing signal PLS sharply on the detected rising edge of the mark detecting signal MARK, and without setting up a phase matching period. Consequently, as shown in FIGS. 2A–2F, the motor synchronizing signal PLS output from the phase control unit 70 is sharply changed on the rising edge of the MARK signal.

Further, the phase control unit 70 outputs the switching signal GA which switches the gain of the amplifier 72 based on this sharp change in signal PLS. This switching signal GA is a signal which can reduce the gain of the amplifier 72 during a specified period (e.g., the period from timing (a) to timing (e) as shown in FIGS. 2A–2F). Thus, the gain of the amplifier 72 is temporarily reduced by the switching signal GA from the phase control unit 70. Reducing the gain of the amplifier 72 during this time period thereby causes the closed loop control gain of the motor control circuit (PLL circuit) 71, including phase comparator 60, LPF 61, amplifier 72, polygon motor 5A, sensor 5H and amplifier/waveform shaper 63, to be reduced.

As the motor control circuit 71 has its closed loop control gain reduced during this specified time period, the ability of motor control circuit 71 to follow the immediate phase varying of the motor synchronizing signal PLS from the phase variable circuit 70 becomes delayed. As a result, an out-of-phase and pull out is not generated.

More specifically, if an out-of-phase and pull out in the motor control circuit 71 is generated, the speed of the polygon motor 51 deviates, and then it is needed to pull in the synchronization in order to control the PLL again with the motor control circuit 71. A long time is required to resume the polygon motor 5A to its normal rotation speed by following the motor control circuit 71 again to the phase of the motor synchronizing signal PLS from the phase control unit 70.

In this first embodiment of the present invention, even if the phase of the motor synchronizing signal PLS is immediately varied with the phase control unit 70, there is no out-of-phase and pull out generated since the closed loop control gain of the motor synchronizing circuit 71 is reduced, and thereby the motor synchronizing signal PLS can be smoothly varied with the phase control unit 70. Further, compared with the method of gradually deviating the phase of the motor synchronizing signal PLS as in the background art, this operation enables the phase of the motor synchronizing signal PLS to be sharply changed.

Figure 11:
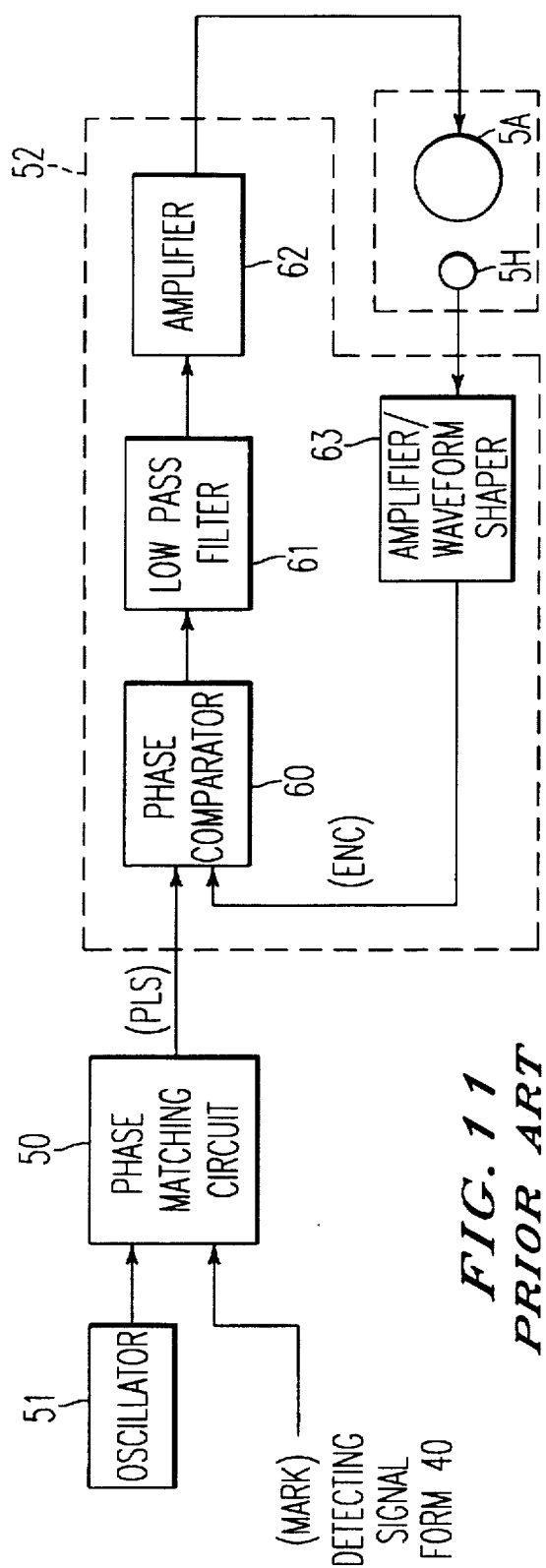
FIG. 11 shows a portion of an embodiment of a color printer according to background art.
Figure 12:
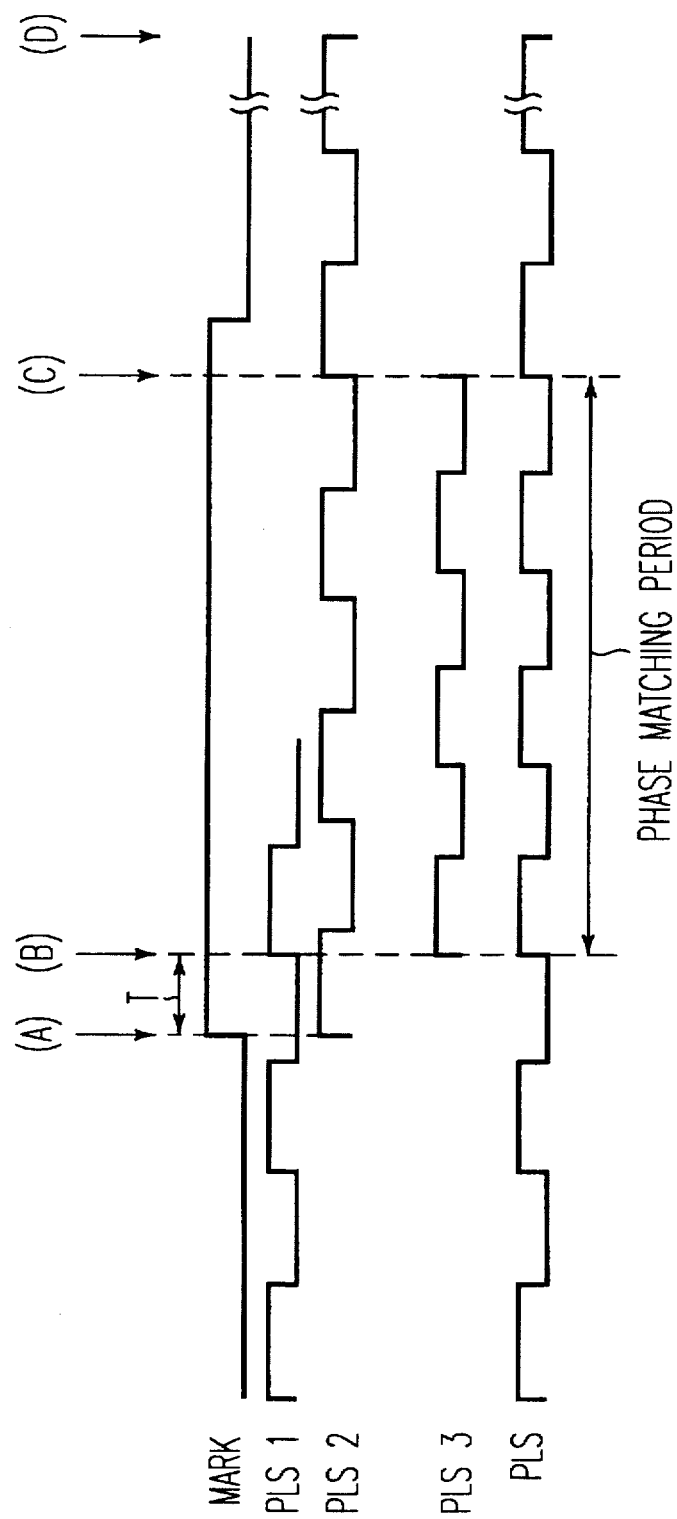
FIG. 12 is a timing chart showing an operational timing of the color printer of FIG. 11.
Figure 13:
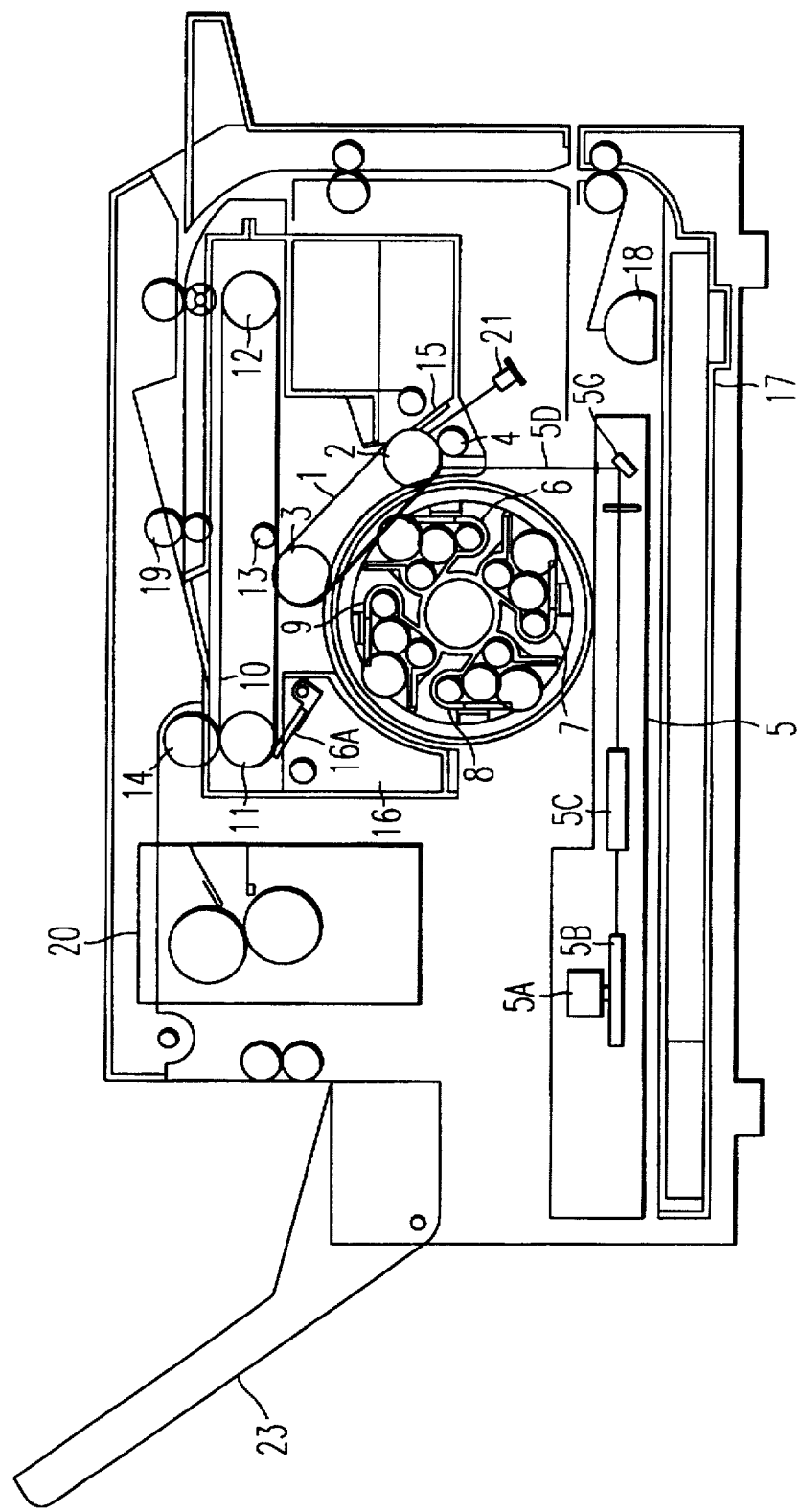
FIG. 13 schematically shows the color printer of FIG. 11.
Figure 14:
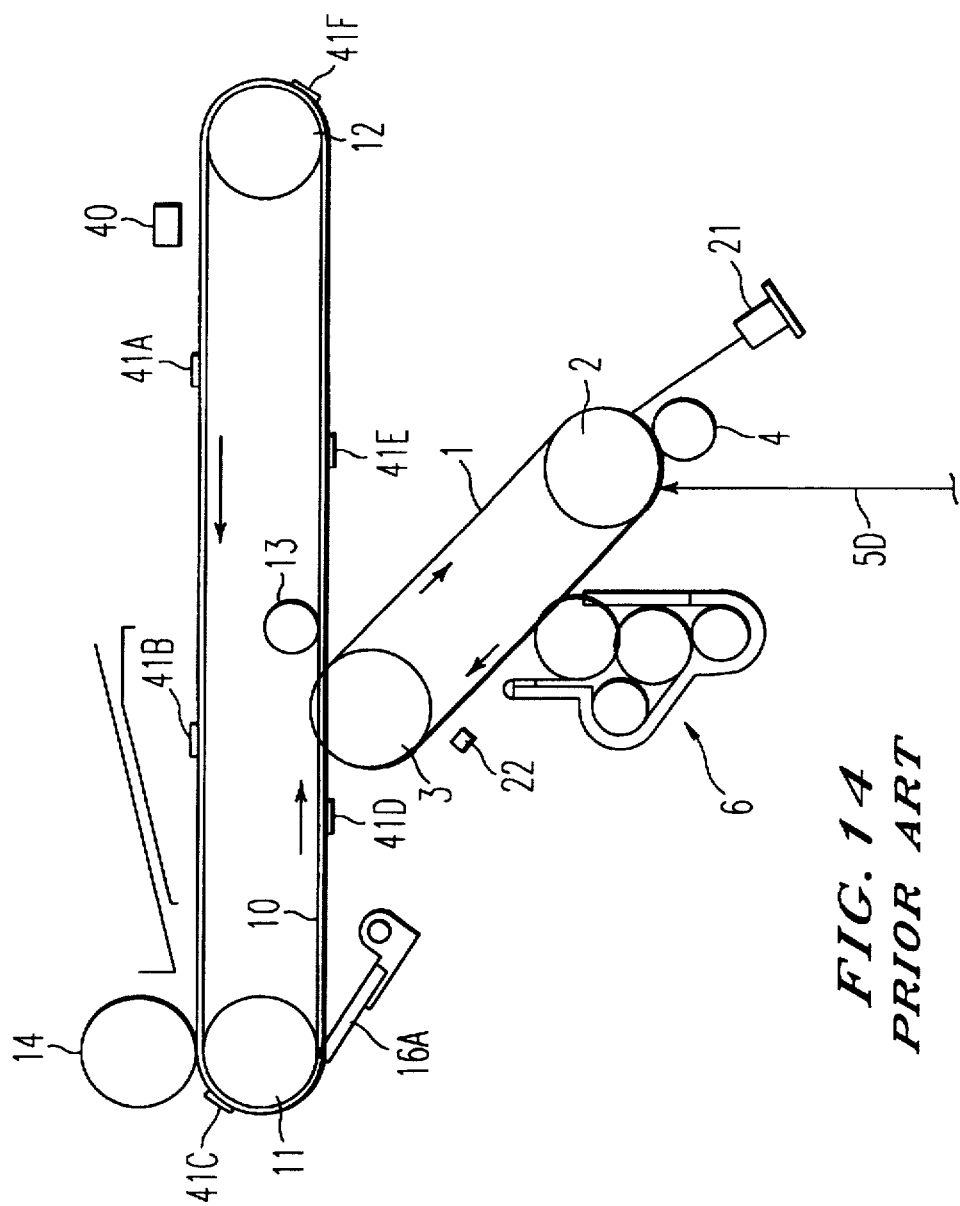
FIG. 14 is an enlarged schematic view showing a portion of the color printer of FIG. 11.
Figure 15:
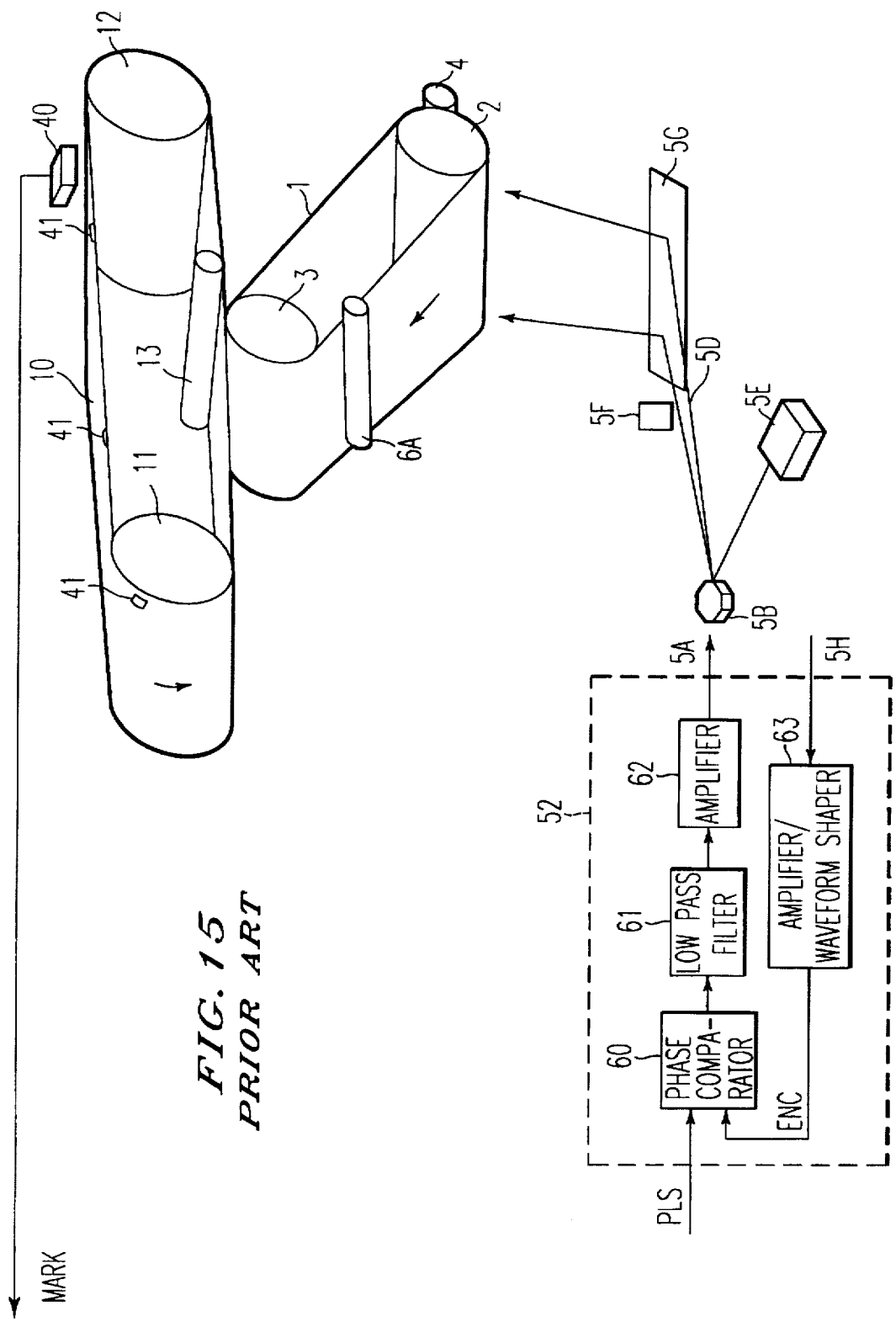
FIG. 15 is an enlarged perspective view showing a portion of the color printer of FIG. 11.
Figure 16:
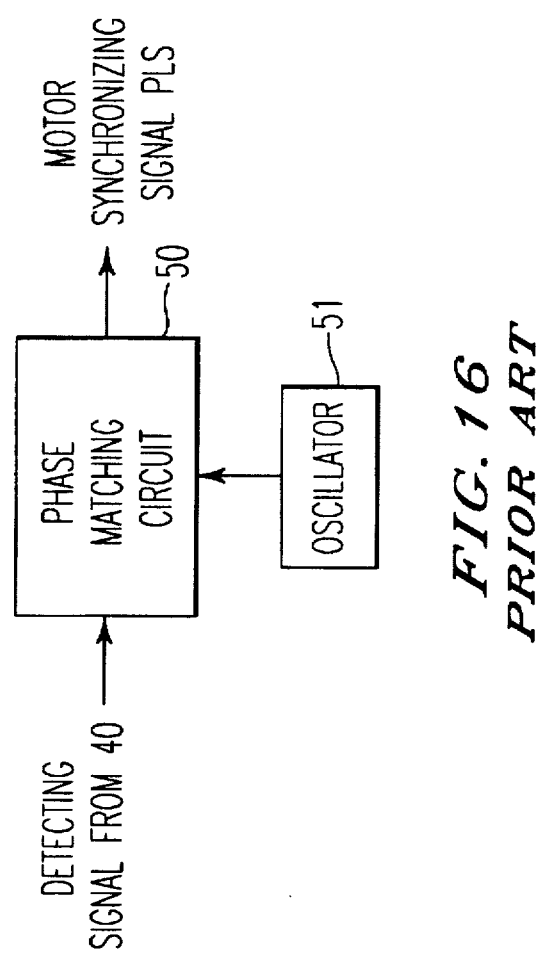
FIG. 16 is a block view showing a portion of the color printer or FIG. 11.
Figure 17:
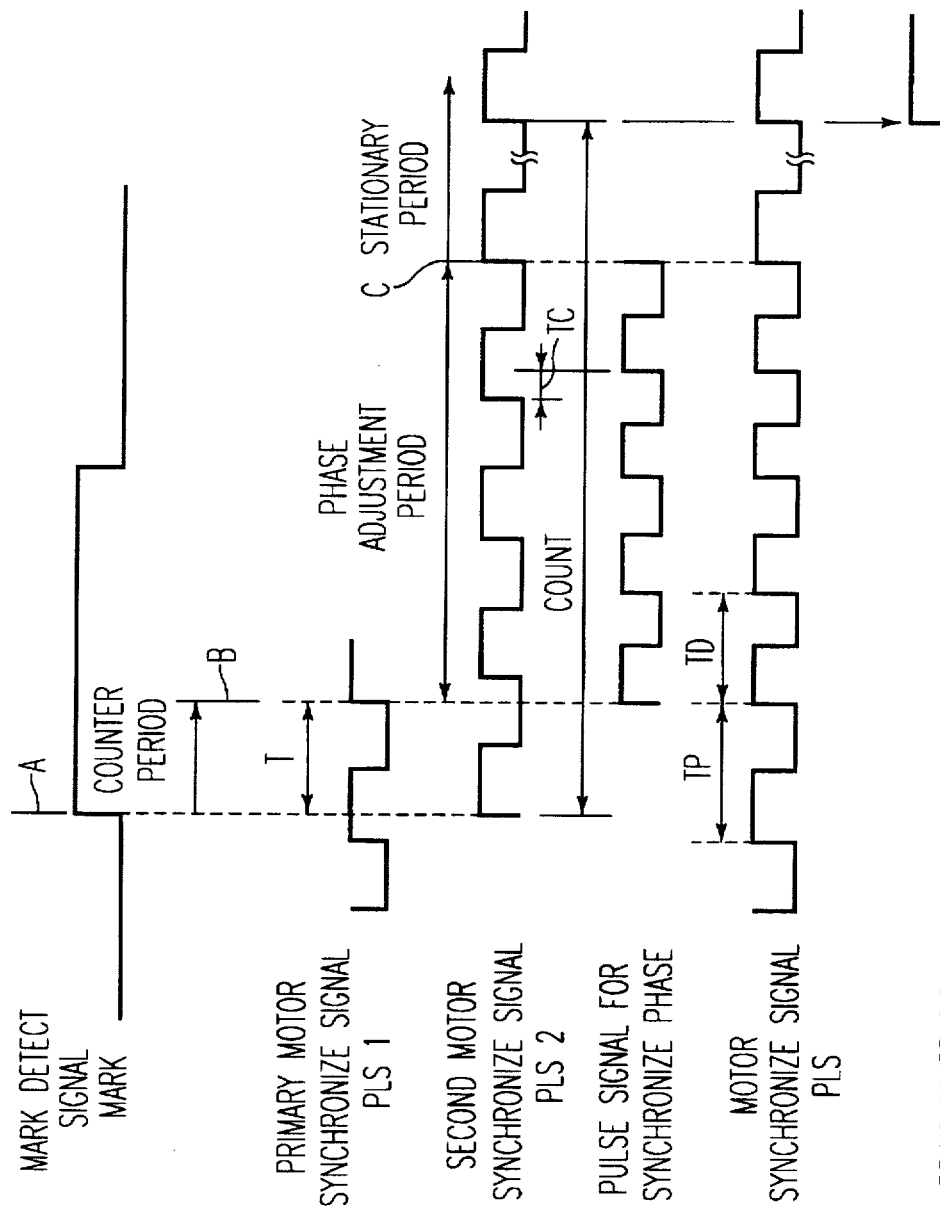
FIG. 17 is a timing chart showing an operational timing of the color printer of FIG. 11.

Moreover, in this operation of the first embodiment of the present invention, the time period when the closed loop gain is suppressed, between times (a) and (e) shown in FIGS. 2A–2F of the present specification, is significantly less than (on the order of one-half of) the phase matching period shown in FIG. 11 of the present specification. As a result, in this operation of the present invention the total time needed to form the four color images on an intermediate transfer belt is significantly reduced, so that overall printing time can be significantly reduced in this operation of the present invention.

FIGS. 1B(1)–1B(3) shows a specific construction of the phase control unit 70 of FIG. 1(a). As is shown in FIGS. 1B(1)–1B(3), the phase control unit 70 includes a phase control circuit 70A and a counter 70B. The phase control circuit 70A outputs the signal PLS as shown in FIGS. 2A–2F to be abruptly changed based on detecting the rising edge of the mark detection signal MARK. The counter 70B outputs the switching signal GA based on detecting the rising edge of the mark detection signal MARK, and counter 70B controls the cycle of switching signal GA, i.e., the time period that signal GA is of the logical low and logical high.

FIG. 1C shows a specific construction of the amplifier 72 which has an adjustable gain. As is shown in FIG. 1C, such an amplifier 72 includes first and second amplifiers XA and XB. The switching signal GA is input to a switch SW1 which can be switched between first and second positions. In the first position, only the output of the amplifier XA is output from amplifier 72. In the first embodiment discussed above, when the switching signal GA is at a logical low, the output of amplifier 72 is limited to the output of amplifier XA, i.e. amplifier 72 has a relatively low gain, as also shown in FIGS. 2A–2F of the present specification in the loop gain suppressed time period. In a loop gain normal operation, the switch SW1 is set to its second position in which the output of both amplifiers XA and XB is output from amplifier 72, so that amplifier 72 has a higher gain.

Figure 3A:
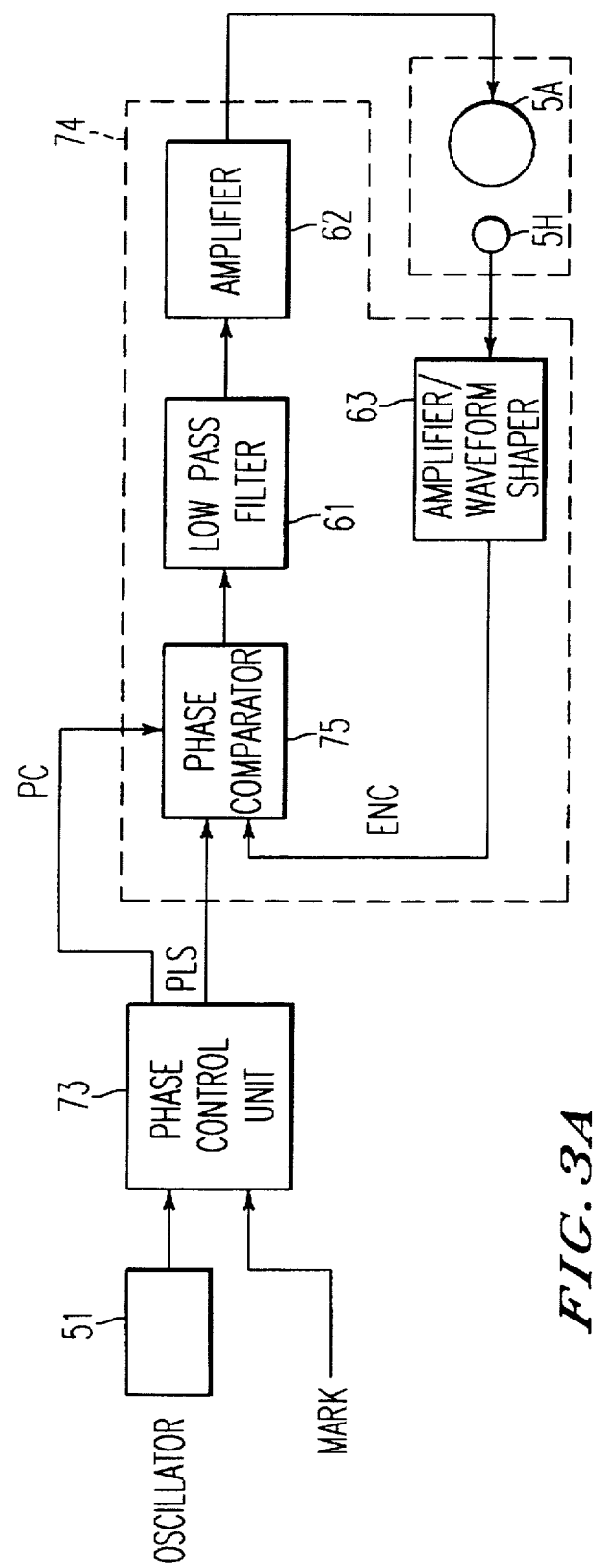

FIG. 3A shows a second embodiment of the present invention.

According to the second embodiment of the present invention, in a color image forming apparatus including a color printer as mentioned above, a phase control unit 73 and a motor control circuit 74 are used as shown in FIG. 3A. The motor control circuit 74 uses a different phase comparator 75 than the phase comparator 60 used in the motor control circuit 71 noted above.

This phase comparator 75 compares a phase of the motor synchronizing signal PLS from the phase control unit 73 with a phase of an output signal of amplifier/waveform shaper 63, and then not only outputs a result of this comparison to LPF 61, but also detects whether the above result of the comparison exceeds a specified threshold value. In other words, the phase comparator 75 has an abnormality detecting function to detect whether a phase difference, as a result of comparing the phase of the motor synchronizing signal PLS from the phase control unit 73 with a phase of an output signal of the amplifier/waveform shaper 63, exceeds a specified threshold value; the specified threshold value has been previously determined as liable to generate an abnormality such as an out-of-phase or pull out in the motor control circuit 74.

FIGS. 4A–4F shows an operational timing of this second embodiment of FIG. 3A. A mark detecting signal MARK from a mark detecting sensor 40 and a clock signal from oscillator 51 are input to phase control unit 73, from which motor synchronizing signal PLS is output after dividing the clock signal from the oscillator 51 as a source signal. The phase control unit 73 firstly generates the motor synchronizing signal (preceding color image) PLS1. When the mark detecting signal MARK is input from the mark detecting sensor 40 at the timing (a) to the phase control unit 73, the phase control unit 73 generates the motor synchronizing signal (subsequent color image) PLS2 by detecting the rising edge of this mark detecting signal MARK, and changes the motor synchronizing signal PLS sharply by detecting the rising edge of the mark detecting signal MARK, and without establishing a phase matching period.

Consequently, as shown in FIGS. 4A–4F, the motor synchronizing signal PLS output from the phase control unit 73 is changed sharply. When the phase control unit 73 sharply changes the phase of the motor synchronizing signal PLS by detecting the rising edge of the mark detecting signal MARK, detecting an out-of-phase of motor control circuit 74 as an abnormality with the abnormality detecting function of the phase comparator 75 would result in requiring a long time to correct this problem by a pulling in and other procedures.

Therefore, in this second embodiment of the present invention, the phase control unit 73 outputs a switch signal PC to the phase comparator 75 to control phase comparator 75 to not detect an out-of-phase (or to reduce the ability to detect an out-of-phase), i.e., for suppressing abnormality detection, as the signal PLS is abruptly changed. This switch signal PC is a signal which is output to the phase comparator 75 to prevent phase comparator 75 from detecting an out-of-phase (or for reducing the ability to detect an out-of-phase) for a specified period of time (or a period from timing (a) to timing (f) as shown in FIG. 4). Again, this time period is less (on the order of one-half of) than the phase matching period of FIG. 11. The phase comparator 75 thus does not detect an out-of-phase during this time period after the signal PLS is abruptly charged.

Further, the phase comparator 75, when it has a problem of not fully detecting an out-of-phase and pull out in the motor control circuit 71 by the abnormality detecting function of the phase comparator 75, decreases its ability to detect an out-of-phase by widely setting up the above threshold value of the abnormality detecting function to widened threshold value TH2. Thus, an out-of-phase or pull out may still be detected if the phase difference between the motor synchronizing signal PLS from the phase control unit 73 and the encoder signal ENC from the amplifier/waveform shaper 63 is larger than the specified widened threshold value TH2, see FIGS. 3C(1)–3C(2). Although a much greater abnormality is required before detection for exceeding the widened threshold value TH2.

In such a manner, phase comparator 75 does not detect an out-of-phase and pull out of the motor control circuit 71, or has a weak setting for detecting such an abnormality, at the time of sharply changing the phase of motor synchronizing signal PLS. This thereby eliminates excessively detecting of an out-of-phase and pull out, and enables the motor synchronizing signal PLS to smoothly change its phase in the phase control unit 73.

Also, the apparatus according to this further embodiment of the present invention is also effective to reduce print time as in the above-discussed first embodiment. According to this second embodiment, a method of sharply changing the phase of motor synchronizing signal PLS is still applied.

FIGS. 3B(1)–3B(3) shows a specific construction of the phase control unit 73 shown in FIG. 3A. As shown in FIGS. 3B(1)–3B(3), this phase control unit 73, similarly as shown in FIGS. 1B(1)–1B(3), includes a phase control circuit 73A and a counter 73B. The phase control circuit 73A abruptly changes the signal PLS based on detecting the rising edge of the mark detection signal MARK. Also, the counter 73B outputs the switching signal PC based on detecting the rising edge of the mark detection signal MARK.

FIGS. 3C(1)–3C(2) shows a specific construction of the phase comparator 75 shown in FIG. 3A. As shown in FIGS. 3C(1)–3C(2), this phase comparator 75 includes a phase comparator circuit 75A and an abnormality detection circuit 75B. The phase comparator circuit 75A of phase comparator 75 is fed with both the signals PLS and the output from the amplifier/waveform shaper 63 ENC. The phase comparator 75 compares these two signals and outputs a result signal OUT. The abnormality detection circuit 75B outputs an alarm signal ERR when this comparison result signal OUT exceeds a predetermined threshold TH1 or TH2. In the operation of the present invention, during the period when the switching signal PC is as at a logical low, as one example, the threshold is lowered (i.e. widened to threshold level TH2 as shown in FIG. 3(c)) so that an abnormality is not as easily detected by the abnormality detection circuit 75B.

Figure 5A:
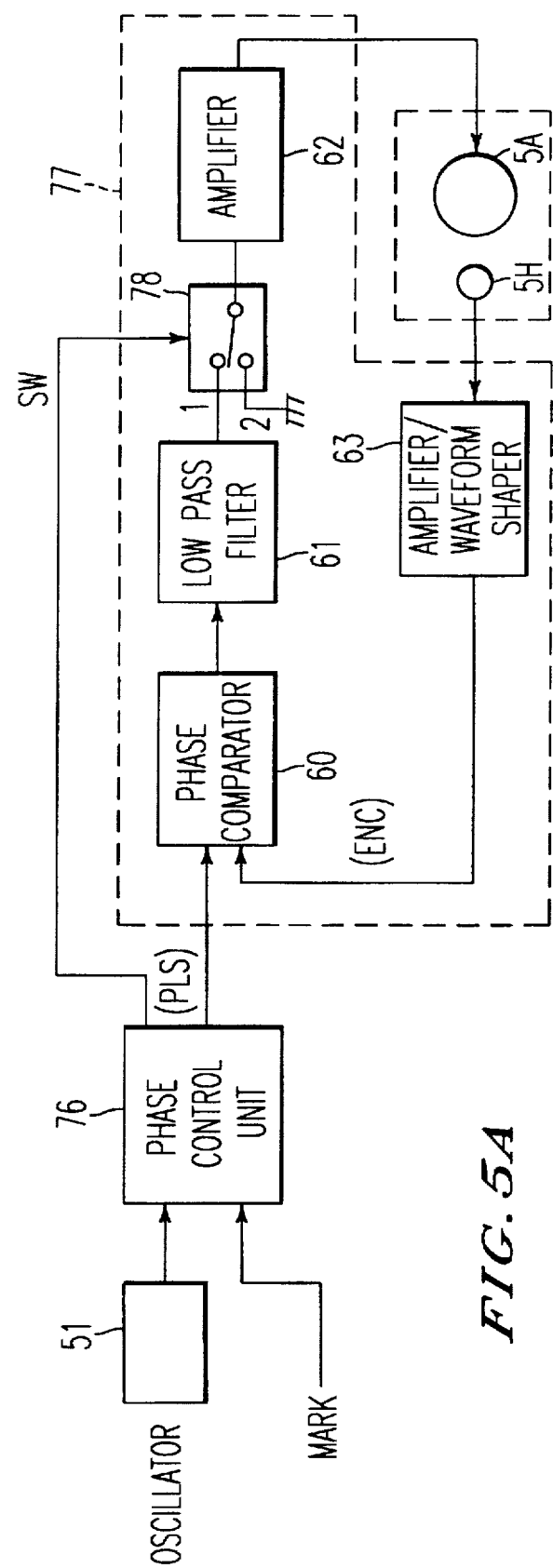

FIG. 5A shows a third embodiment according to the present invention.

This third embodiment is an embodiment in which a color image forming apparatus including a color printer, a phase control unit 76 and motor control circuit 77 are used as shown in FIG. 5A. The motor control circuit 77 includes a switch 78 before amplifier 62. This switch 78 selects whether the motor control circuit 77 is in a closed loop by connecting an input of the amplifier 62 to an output side (1) of LPF 61, or by connecting the input of the amplifier 62 to ground (2), as controlled by the switch signal SW from the phase control unit 76.

FIGS. 6A–6F is a timing chart showing an operational timing of this third embodiment of the present invention of FIG. 5A. A mark detecting signal MARK from a mark detecting sensor 40 and a clock signal from oscillator 51 are input to phase control unit 76, from which motor synchronizing signal PLS is output after dividing the clock signal from the oscillator 51 as a source signal. The phase control unit 76 firstly generates the motor synchronizing signal (preceding color image) PLS1. When the mark detecting signal MARK is input from the mark detecting sensor 40 at the timing (a) to the phase control unit 76, the phase control unit 76 generates the motor synchronizing signal (subsequent color image) PLS2 by detecting the rising edge of the mark detecting signal MARK, and changes the motor synchronizing signal PLS sharply by detecting the rising edge of the mark detecting signal MARK, and without setting up a phase matching period.

Consequently, as shown in FIGS. 6A–6F, the motor synchronizing signal PLS output from the phase control unit 76 sharply change its phase. When the phase control unit 76 sharply changes the phase of motor synchronizing signal PLS by detecting the rising edge of the mark detecting signal MARK, the level of switch signal SW input to switch 78 will go, as an example, to a logical high. This switch signal SW is maintained at a logical high level for a specified period (the period from timing (a) to timing (g) as shown in FIGS. 6A–6F). Again, this time period is less (on the order of one-half of) than the phase matching period of FIG. 11. The switch 78 then, upon receiving the logical high signal SW, connects the input of the amplifier 62 to ground, and the input voltage to amplifier 62 then becomes zero based on this logical high level of the switch signal SW from the phase control unit 76.

For this reason, the amplifier 62 allows the current output to the polygon motor 5A to then become zero. The polygon motor 5A, which has been rotated at a regular speed until such a time, now rotates only by its inertia force as no current is supplied from the amplifier 62. At this time, the rotation speed of the polygon motor 5A is gradually reduced by frictional resistance, and the rotation phase of polygon motor 5A gradually deviates from the rotation phase at its regular speed. Further, when the rotation phase of the polygon motor 5A gradually deviates to reach a desired phase, switch signal SW is changed to a logical low, and the switch 78 then resumes its original state and connects the input of amplifier 62 to the output of LPF 61, to reestablish the closed loop.

As shown in FIGS. 6A–6F, the polygon motor 5A, as indicated by encoder signal ENC, first rotates to follow the motor synchronizing signal PLS1 from the phase control unit 76. The encoder signal ENC from the amplifier/waveform shaper 63 indicates the rotation phase of polygon motor 5A, so firstly the phase of motor synchronizing signal PLS1 from the phase control unit 76 is the same as the phase of encoder signal ENC from the amplifier/waveform shaper 63. When the switch 78 connects the input of amplifier 62 to ground at the timing (a), and the motor control circuit 77 which was in a closed loop state enters an open loop state, the rotation speed of polygon motor 5A is gradually reduced.

This is indicated by the cycle of the encoder signal ENC from the amplifier/waveform shaper 63 being lengthened, which causes the phase of encoder signal ENC to deviate from the phase of motor synchronizing signal PLS1. At the timing (a), the motor synchronizing signal PLS from the phase control unit 76 sharply changes to the motor synchronizing signal (subsequent color image) PLS2. At this same time, the switch signal SW is switched to a logical high, so that the motor control circuit 77 enters an open loop state, and thereby the rotational speed of polygon motor 5A gradually decreases, which thereby results in motor synchronization signal PLS having a cycle which gradually is lengthened. At a time (g) when the phase of encoder signal ENC, which is gradually deviating, reaches in close proximity the phase of motor synchronizing signal PLS2, switch signal SW is switched back to a logical low, and the switch 78 then resumes its original state and connects the input of amplifier 62 to the output of LPF 61.

In such a manner, a method of making the closed loop of motor control circuit 77 in an open loop state enables the rotation phase of polygon motor 5A to smoothly match the phase of motor synchronizing signal PLS, without forcibly matching the rotation phase of polygon motor 5A to the phase of motor synchronizing signal PLS. This results even with the sharp change of the phase of motor synchronizing signal PLS, which further prevents generating an out-of-phase and pull out from the phase and synchronization of motor control circuit 77.

In this further embodiment, the timing to switch signal SW to return to a logical low, and to thereby turn the switch 78 back to the input of amplifier 62, called "topen", is determined as follows. The time t for the timelag between the timing (a) of the rising edge of the mark detecting signal MARK and the timing (b) of the rising edge of the motor synchronizing signal PLS1 is a time which generates an out-of-phase in the motor synchronizing signal PLS. The phase control unit 76 determines the time "topen" depending on the degree that the rotation phase of polygon motor 5A deviates from the time t at timing (a) when the closed loop of motor control circuit 77 is caused to enter in the open loop state.

In other words, the phase control unit 76 determines the time "topen" so as to lengthen the time "topen" when the time for the out-of-phase t is long. Then, when causing the closed loop of motor control circuit 77 to enter in the open loop state, the degree of deviation in the rotation phase of polygon motor 5A may be calculated from the characteristic value of the polygon motor 5A, or may be obtained experimentally.

Further, in this embodiment, a method of sharply changing the phase of motor synchronizing signal PLS is applied, contrary to the method of gradually deviating the phase of motor synchronizing signal PLS as in the background art.

FIGS. 5B(1)–5B(3) show a specific construction of the phase control unit 76 of FIG. 5A. As shown in FIG. 5B, this phase control unit 76, similarly as shown in FIG. 1(b), includes a phase control circuit 76A and a counter 76B. The phase control unit 76A abruptly changes the signal PLS based on detecting the rising edge of the mark detection signal MARK. Further, the counter 76B outputs the switching signal SW based on detecting the rising edge of the mark detection signal MARK.

Figure 7A:
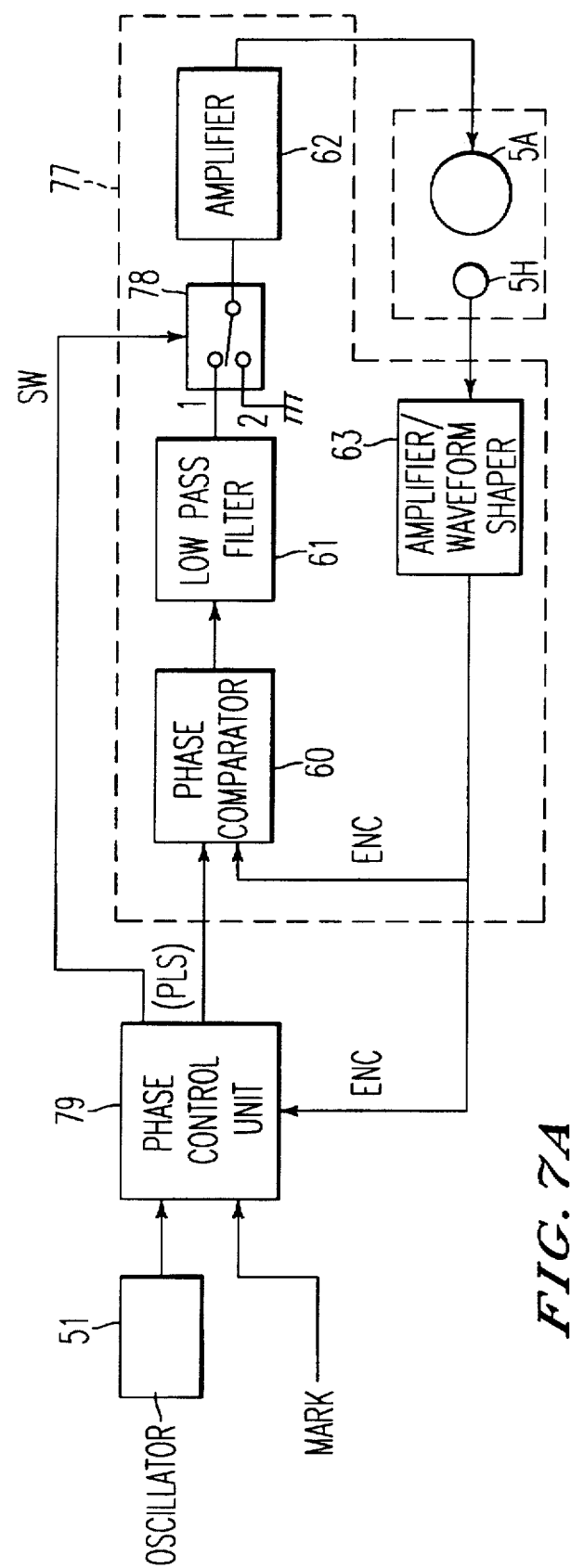

FIG. 7A shows a fourth embodiment according to the present invention.

In this fourth embodiment of the present invention, a phase control unit 79 is used instead of the phase control unit 76. In this further embodiment the encoder signal ENC from the amplifier/waveform shaper 63 is input to phase control unit 79.

This fourth embodiment operates almost the same as the third embodiment discussed above. In the third embodiment as discussed above, the time "topen" in which the loop of motor control 77 is in the open loop state with the switch signal SW at the logical high level is determined by the time t for the timelag and the degree of the rotation phase of polygon motor 5A deviating at the timing (a) of putting the motor control circuit 77 in the open loop state.

In this fourth embodiment, the time "topen" is determined by observing the phase conditions of encoder signal ENC from the amplifier/amplifier waveform 63. In other words, in this fourth embodiment when the phase of encoder signal ENC matches the phase of motor synchronizing signal PLS2, the switch signal SW is switched to a logical low, and then the loop of motor synchronizing circuit 77 is placed in a closed loop state.

Figure 8:
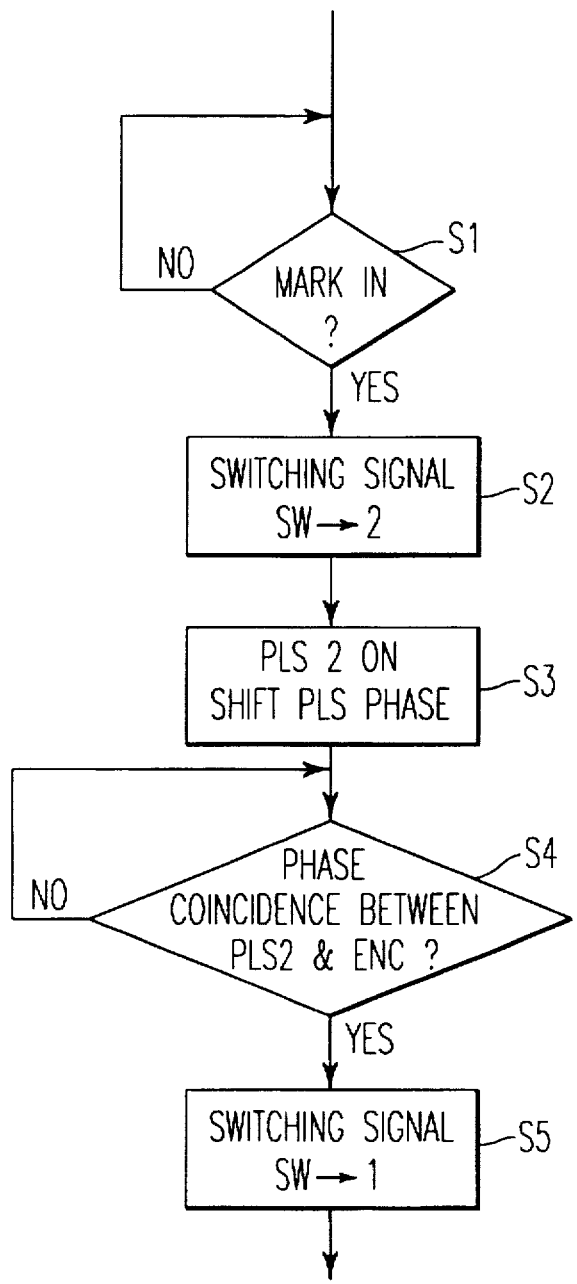
FIG. 8 is a timing chart showing an operational timing of the fourth embodiment.

FIG. 8 shows a part of a processing flow of the phase control unit 79 in this fourth embodiment. The rising edge of the MARK signal is first detected in step S1. Then, the phase control unit 79 switches the switch signal SW from the logical low level to the logical high level in step S2 by this detection of the rising edge of the mark detecting signal MARK from the mark detecting sensor 40, which produces the motor synchronizing signal (subsequent color image) PLS2. Then, in step S3, the motor synchronizing signal PLS is sharply switched to match the motor synchronizing signal PLS2, and without setting up a phase matching period. Next, in step S4, the phase control unit 79 compares the phase of encoder signal ENC from the amplifier/waveform shaper 63 with the phase of motor synchronizing signal PLS2. When the phase of encoder signal ENC matches the phase of motor synchronizing signal PLS2, the phase control unit 79 switches the switch signal SW to the logical low level in step S5, which causes motor control circuit 77 to return to the closed loop state, i.e., switch 78 is switched to reconnect amplifier 62 to LPF 61.

Determining the time "topen" on the basis of the degree and timelag t of deviating the rotation phase of polygon motor 5A at the timing (a) of motor control circuit 77 as in the third embodiment may cause the characteristic value of polygon motor 5A to produce a dispersion, and may also cause the time "topen" to generate errors as a result of changes in environment for using the polygon motor 5A. However, in this fourth embodiment, because the rotation phase of polygon motor 5A is actually observed, neither dispersion produced on the characteristic value of polygon motor 5A nor errors on the time "topen" according to changes in environment for using the polygon motor 5A occur, which enables the loop of motor control circuit 77 to be accurately returned to the closed loop state.

Moreover, in this further embodiment, a method of sharply changing the phase of motor synchronizing signal PLS is applied, contrary to the method of gradually deviating the phase of motor synchronizing signal PLS as in the background art.

FIGS. 7B–7C(2) show a specific construction and operation of the phase control unit 79. As shown in FIG. 7B, the phase control unit 79 includes a phase control circuit 79A, a phase comparator 79B and a signal generator 79C.

This phase control unit 79 operates as follows. The phase control circuit 79A abruptly changes the phase of the motor synchronizing signal PLS based on detecting the rising edge of the mark detection signal MARK. Further, the phase comparator 79B receives as inputs the motor synchronizing signal PLS output from the phase control circuit 79A and the encoder signal ENC output from the amplifier/waveform shaper 63. When there is a coincidence between the motor synchronizing signal PLS and the encoder signal ENC, the phase comparator 79B outputs signal EQ. The signal generator 79C outputs the switch signal SW based on detecting the rising edge of the mark signal MARK, which thereby causes the switch signal to go to a logical high level. The switch signal SW then returns to the logical low level when the signal EQ is output from phase comparator 79B.

In this way, in this operation of the present invention, the device as shown in FIG. 7A enters an open loop state upon detecting the rising edge of the mark detection signal MARK based on the control from the switch signal SW. Then, when the phase of the motor synchronizing signal PLS and the phase of the encoder signal ENC coincide, the circuit shown in FIG. 7A returns to its closed loop state as the switch signal SW returns to its logical low level, so the amplifier 62 is then again connected to low pass filter 61.

Figure 9A:
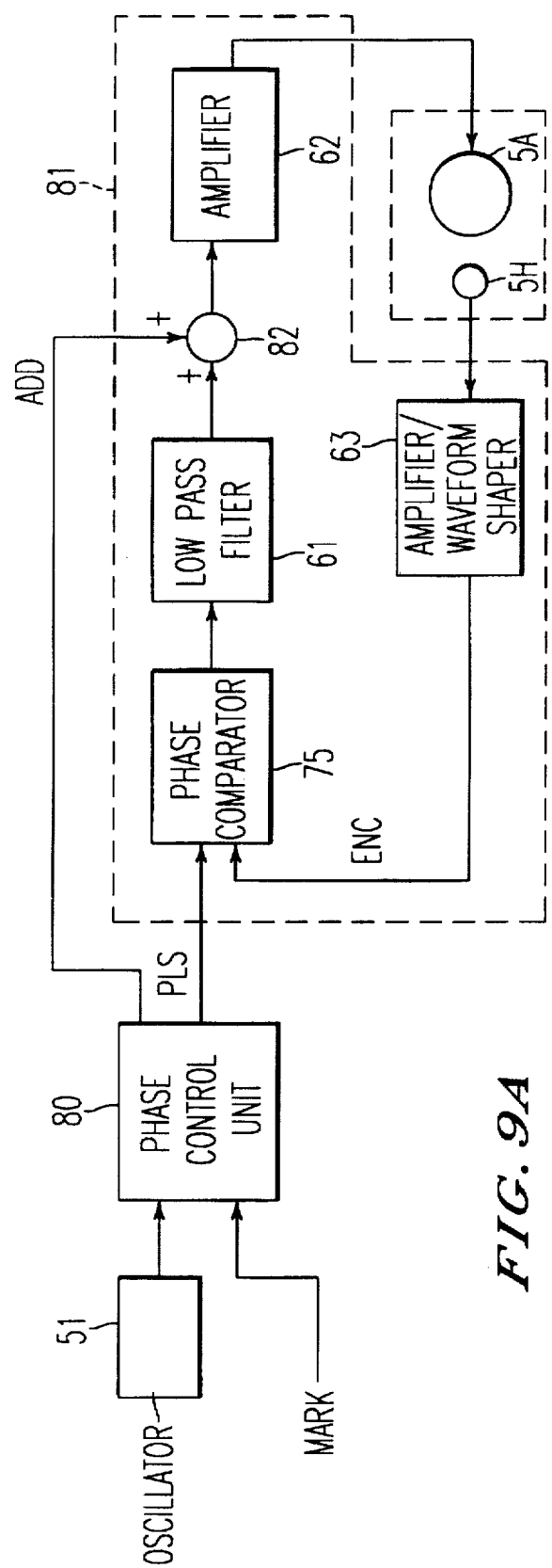

FIG. 9A shows a fifth embodiment according to the present invention.

In this fifth embodiment, a color image forming apparatus including a color printer as mentioned above, a phase control unit 80 and motor control circuit 81 are used. The motor control circuit 81 contains an adder 82 at an input to amplifier 62. In the above-discussed third and fourth embodiments, the rotation phase of polygon motor 5A gradually shifts by making motor control circuit 77 in an open loop state, while in this fifth embodiment the rotation phase of polygon motor 5A is shifted by positively rotating polygon motor 5A.

The phase control unit 80 outputs signal PLS as a motor synchronizing signal by dividing a clock signal from oscillator 51 as a source signal. The mark detecting signal MARK is input from mark detecting sensor 40 to the phase control unit 80 at a timing (a), see FIGS. 10A–10F, the motor synchronizing signal (subsequent color image) produces PLS2 by detecting the rising edge of the mark detecting signal MARK, and without setting up the phase matching period, and then the motor synchronizing signal PLS is immediately sharply changed to match motor synchronizing signal PLS2 by detecting the rising edge of the mark detecting signal MARK.

Consequently, as shown in FIGS. 10A–10F, the motor synchronizing signal PLS output from the phase control unit 80 sharply changes its phase. The phase control unit 80 then also outputs an adding pulse ADD to the adder 82. In other words, the phase control unit 80 generates the adding pulse ADD at timing (a) of detecting the rising edge of the mark detecting signal MARK from the mark detecting sensor 40.

Then, the adder 82 adds the adding pulse ADD from the phase control unit 80 to the conventional steady-state value of voltage (output signal of LPF 61), which is then output to amplifier 62. At this time, the current supplied from the amplifier 62 to the polygon motor 5A increases from the steady-state value by the value of adding pulse ADD.

Increasing the current supplied to the polygon motor 5A causes the polygon motor 5A to increase its rotation speed. FIGS. 10A–10F indicate such an operation. As shown in FIGS. 10A–10F, the adding pulse ADD is output to the adder 82 at timing (a). The phase control unit 80 determines the pulse height value and/or pulse breadth of adding pulse ADD output to the adder 82 according to the timelag t between the motor synchronizing signal PLS2 and the mark detecting signal MARK (according to the mark detecting timing (a) of the mark detecting sensor 40).

When the adding pulse ADD is added to the output signal of steady-state LPF 61, the polygon motor 5A starts to rotate at a higher speed than previously. The encoder signal ENC from the amplifier/waveform shaper 63 as shown in FIG. 10 indicates such as showing that the pulse cycle is shortened by adding the adding pulse ADD. The motor synchronizing signal PLS sharply changes its phase to that of the motor synchronizing signal PLS2 at the mark detecting timing (a) of the mark detecting sensor 40, and when the phase of encoder signal ENC matches the phase of motor synchronizing signal PLS2, this allows the adding pulse ADD to then be zero.

In this fifth embodiment, compared with the method of waiting for the rotation phase of polygon motor 5A to gradually shift by inertia force by making motor control circuit 77 in an open loop state as in the above third and fourth embodiments, the rotation phase of polygon mirror 5B changes in a shortened time because the rotation phase of polygon motor 5A is shifted by positively increasing the rotation of polygon motor 5A.

FIGS. 9B(1)–9B(2) shows a specific construction of the phase control unit 80 of FIG. 9A. As shown in FIGS. 9B(1)–9B(2), the phase control unit 80 includes a phase control circuit 80A, a counter 80B and a voltage switch circuit 80C. In this phase control unit 80, the phase control circuit 80A outputs the PLS signal fed to motor control circuit 81 according to a timing of detecting the rising edge of the mark detection signal MARK. In the operation of the phase control unit 80 as shown in FIG. 9A, when the voltage output switch 80C is set to a first switch position, an add signal $V_{add}$ is output from a voltage source $V_{add}$. In this position, the output signal ADD is provided to adder 82 as discussed above. When the voltage output switch 80C is switched to a second switch position, the add signal ADD is not output, i.e. a zero volt signal is output as ADD signal.

In this operation of the phase control unit 80 of FIGS. 9B(1)–9B(2), the counter 80B outputs a switching signal to the voltage output switch 80C after a predetermined time T, as measured from detecting the rising edge of the mark detection signal MARK. In this way, the counter 80B controls the amount of time that the signal ADD is at a logical high, and is thus added as an input to amplifier 62. When the time T has expired, the output from the counter 80B to the voltage output switch 80C is switched to cause the voltage output switch 80C to switch from the first switch position to the second switch position, so that no ADD signal is then output.

FIG. 9C details a structure of the adder 82, which is formed of resistors R1–R3 and operational amplifier 83. As is shown in FIG. 9C, such an adder 82 operates so that the output voltage V0 is the sum of the input voltages V1 and V2.

Figure 9D:
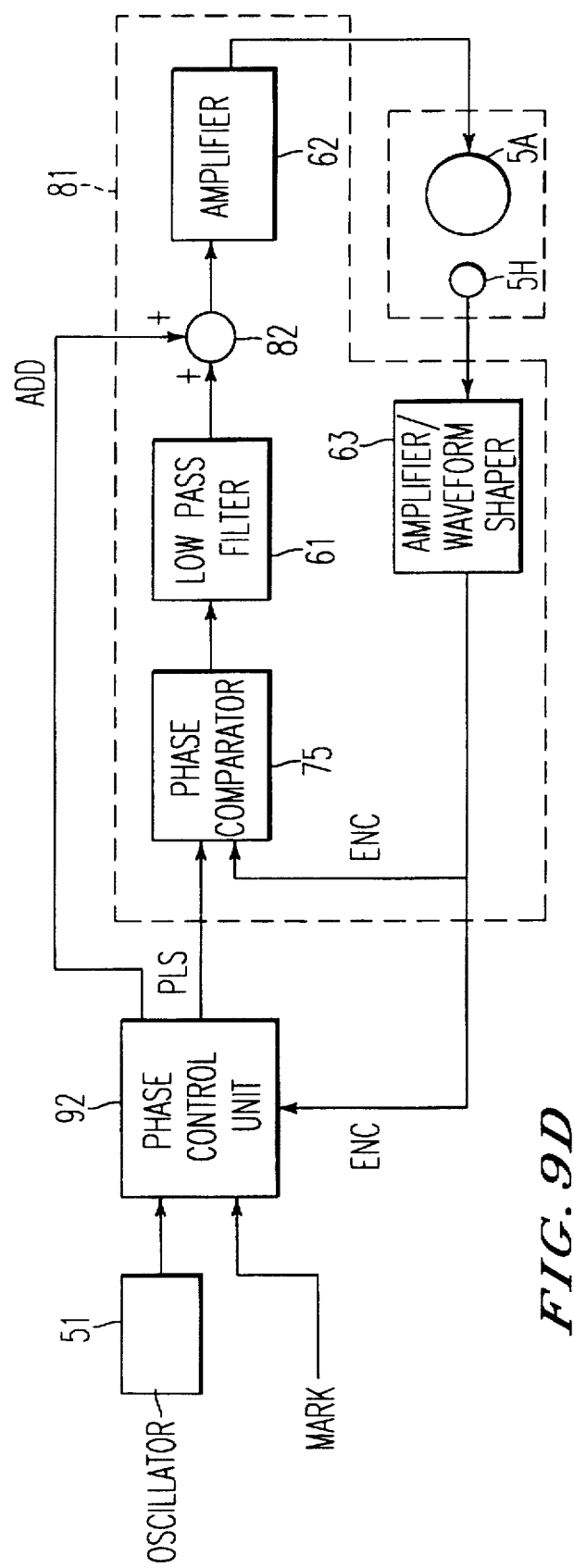

Further, in a modification of this fifth embodiment as shown in FIG. 9D, and similarly to the above fourth embodiment, the encoder signal ENC may be input from the amplifier/waveform shaper 63 to the phase control unit 80. The phase control unit 80 then compares the phase of encoder signal from the amplifier/waveform shaper 63 with the phase of motor synchronizing signal PLS2, and then stops adding pulse ADD at a time when the phase of encoder signal ENC matches the phase of motor synchronizing signal PLS2.

In the above fifth embodiment, the addition of adding pulse ADD causes the polygon motor 5A to increase its rotation speed, but a similar effect may be obtained by positively reducing the rotation speed of the polygon motor 5A by subtracting a subtracting pulse from the output signal of LPF 61 using a subtracter instead of adder 82. Such a subtracting pulse would be output at a same timing of adding pulse ADD from the phase control unit 80. In this instance, compared with the case of rotating the polygon motor 5A with the inertia force in an open loop state, the subtraction of subtracting pulse allows the polygon motor 5A to positively reduce its rotation speed, which further causes the rotatable polygonal mirror 5B to shorten the time needed for changing its rotation phase.

Also, changing from the addition of adding pulse ADD raising the rotation speed of polygon motor 5A to the subtraction of a subtracting pulse reducing the rotation speed of polygon motor 5A, as the case may be, further enables the rotatable polygonal mirror 5B to shorten the time necessary for changing its rotation phase. Further, in the fifth embodiment, the insertion of the adder 82 into the motor control circuit 81 causes the addition of adding pulse ADD, but when adding the adding pulse ADD, the addition of adding pulse ADD in the open loop state of a closed loop of the motor control circuit 81 allows obtaining an effect similar as discussed above.

Figure 1D:
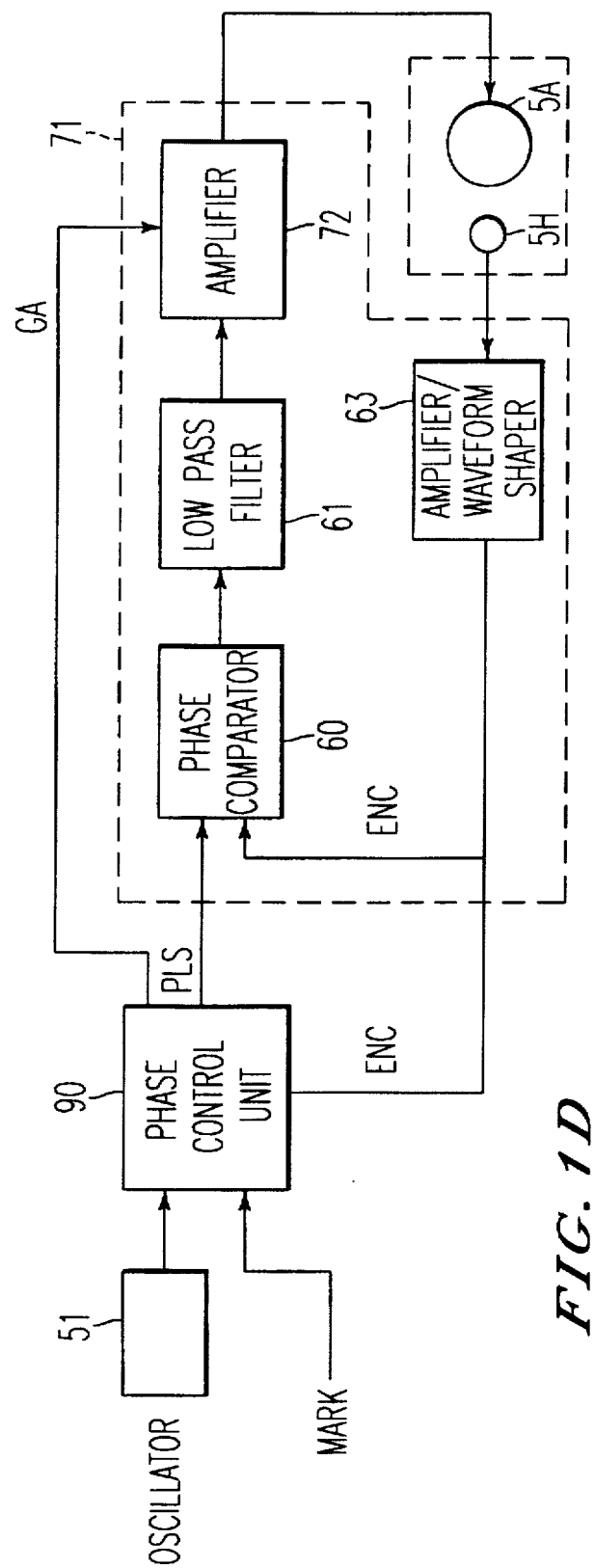

FIGS. 1D–1F(2) show a further embodiment of the present invention which essentially modifies the first embodiment of FIG. 1A to include the further feedback of encoder signal ENC, similarly as discussed above with respect to FIG. 7A. More specifically, in this further embodiment of the present invention as shown in FIG. 1D, the encoder signal ENC output from amplifier/waveform shaper 63 is input to phase control unit 90. In this operation of the present invention, a loop gain is reset when the signals PLS and ENC coincide.

FIGS. 1E–1F(2) show a specific construction of the phase control unit 90, which includes a phase control circuit 90A, a phase comparator 90B and a signal generator 90C. This phase control unit 90 operates similar to that as discussed above with respect to FIGS. 3B(1)–3B(3).

As shown in FIGS. 1E–1F(2), a phase control circuit 90A outputs a signal PLS to abruptly change based on detecting a rising edge of the mark detection signal MARK. Further, phase comparator 90B is fed with both of the PLS signal and the ENC signal and outputs a signal EQ when a coincidence between the PLS signal and the ENC signal is detected. When such a coincidence is detected, and signal EQ is output of phase comparator 90B and is supplied to signal generator 90C, then the switching signal GA resumes its logical high level, so that the gain of the amplifier 71 returns to its conventional higher gain value. In this way, signal generator 90C outputs switching signal GA to switch to a logical low level after the signal PLS is abruptly changed, and then switching signal GA returns to its logical high level after the coincidence signal EQ, indicating a coincidence between the signals PLS and ENC, is detected.

Similarly as discussed above with respect to FIGS. 1D–1F (2), this feedback of providing the signal ENC to the phase control units can also be applied to other embodiments of the present invention.

Figure 3D:
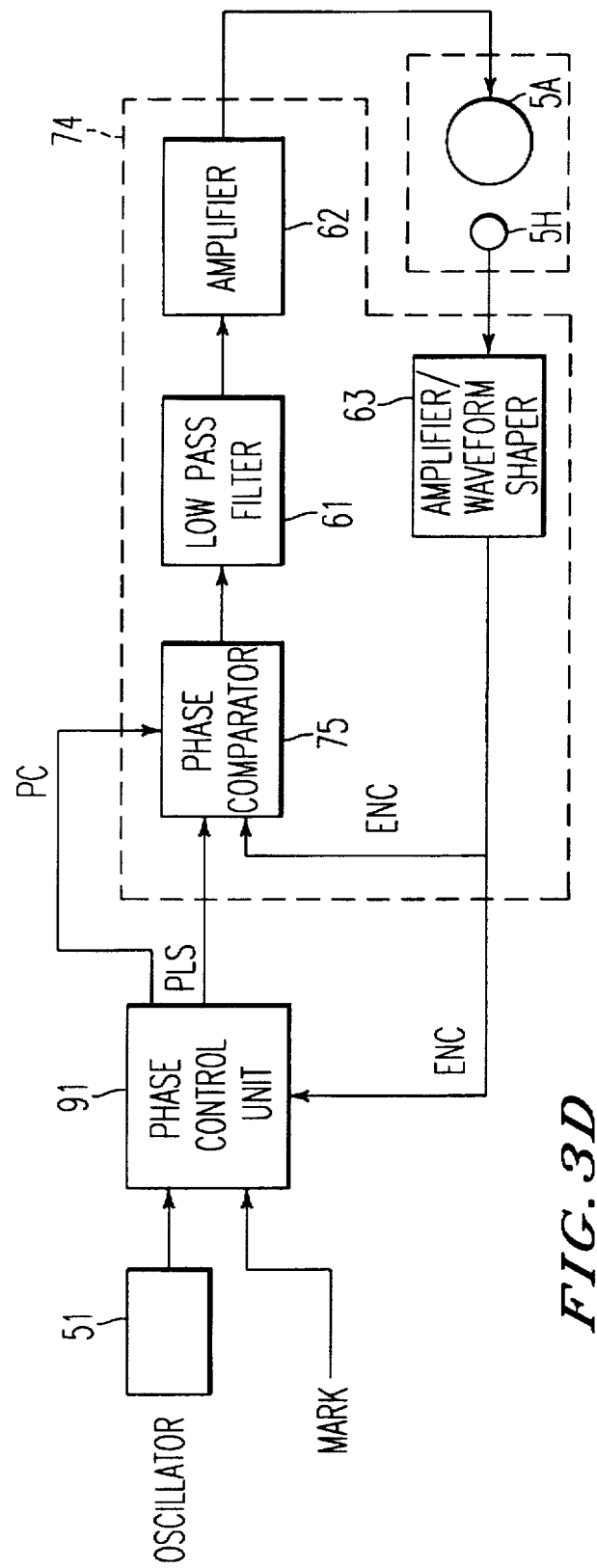

As shown in FIGS. 3D–3F(2), in a further modification of the second embodiment of the present invention the ENC signal can be fed back to phase control unit 91, shown in further detail in FIGS. 3E–3F(2). In this further embodiment of the present invention, the switching signal PC is returned to its logical high value when a coincidence is detected between signals PLS and ENC.

Figure 9E:
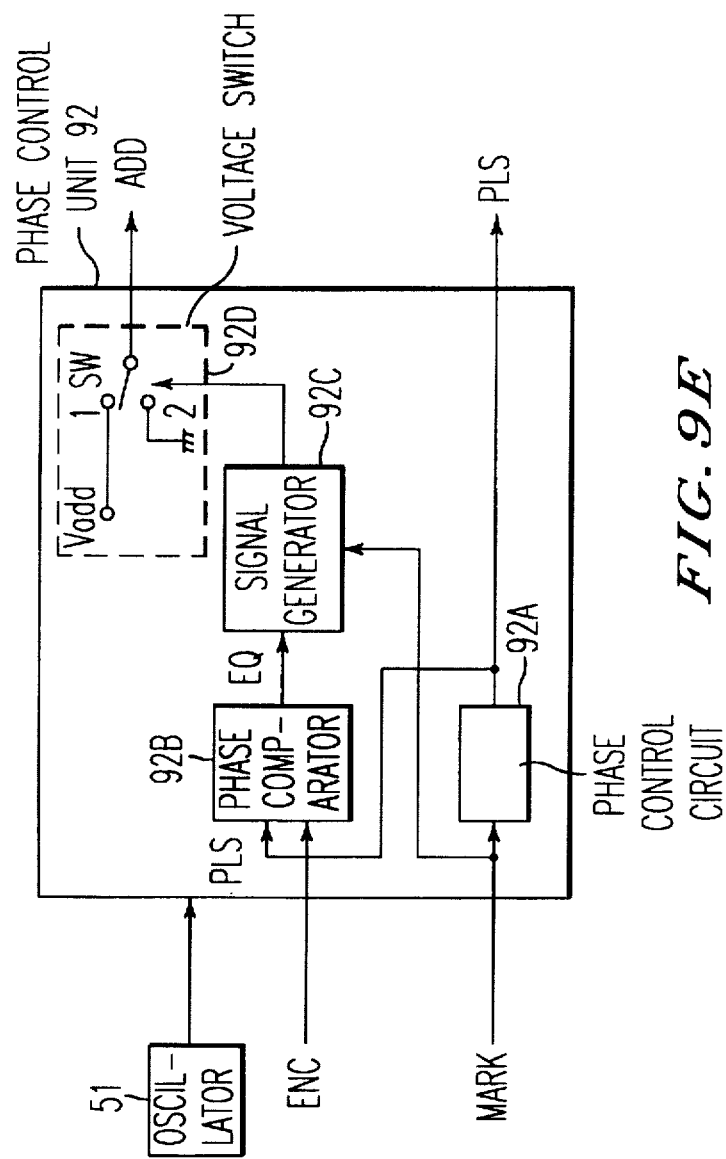

This same principle of the present invention can be applied to the further embodiment as shown in FIGS. 9D–9F(2) which shows the ENC signal being further fed back to phase control unit 92. In this operation of the present invention, the signal ADD returns to its logical low (zero) value after a coincidence is detected between signal PLS and signal ENC.

As shown in FIGS. 9E–9F(2), the phase control unit 92 has a structure to include a phase control circuit 92A, a phase comparator 92B, a signal generator 92C and a switch 92D. This phase control unit 92 operates so that the motor synchronizing signal PLS is output of phase control circuit 92A based on detecting a rising edge of the mark detection signal MARK. This signal PLS is also input to the phase comparator 92B, along with the encoder signal ENC output from amplifier/waveform shaper 63. When a coincidence between the encoder signal ENC and the signal PLS is detected in phase comparator 92B, a signal EQ is output of phase comparator 92B.

The signal generator 92C operates to switch from a logical low level to a logical high level upon detecting the rising edge of the mark detection signal MARK. In this stage, the switch 92D is set to the first position so that the output of the add signal ADD is at a logical high, and has an output voltage $V_{ADD}$. When the coincidence signal EQ is output of phase comparator 92B, the output of the signal generator 92C switches so that the switch 92D is then in a second position, in which case no add signal ADD is output, i.e. the ADD signal has a zero voltage.

In this way, in this operation of the present invention, upon detecting the rising edge of the mark detection signal MARK, the voltage output to amplifier 62 is increased by the value $V_{ADD}$. When a coincidence is detected between the motor synchronizing signal PLC and the encoder signal ENC, no ADD signal is provided to adder 82, and thus the input into amplifier 62 returns to a normal level.

Also, the present invention is in not limited to the above embodiments, but is applicable to, for example, color copy machines, color facsimiles and other color image forming apparatus similarly to the color printers.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A color image forming apparatus comprising:
   a photosensitive body;
   a latent image forming unit for forming a plurality of sequential images of respective colors on the photosensitive body, and including a polygon motor for driving a rotatable mirror for deflecting an exposing beam to impinge on the photosensitive body;
   an intermediate transfer body to which the image formed on the photosensitive body is transferred;
   a mark detector for detecting a timing mark on the intermediate transfer body;
   a closed loop control circuit for generating a motor drive signal for controlling rotation of the polygon motor;

a phase control unit for controlling the closed loop control circuit by inputting a motor synchronizing signal to the closed loop control circuit to control the motor drive signal, and for sharply changing a phase of the motor synchronizing signal to be synchronized with detecting the timing mark without generating an abnormality in the closed loop control circuit.

2. The color image forming apparatus according to claim 1, wherein the closed loop control circuit includes an amplifier with a variable gain, and wherein the phase control unit generates a switching signal to reduce a gain of the amplifier when the phase of the motor synchronizing signal is sharply changed.

3. The color image forming apparatus according to claim 2, wherein the closed loop control circuit further outputs an encoded signal indicating a rotational phase of the polygon motor, and the phase control unit controls generation of the switching signal based on detecting a coincidence in phase of the motor synchronizing signal and the encoded signal.

4. The color image forming apparatus according to claim 1, wherein the closed loop control circuit includes a phase comparator for detecting the abnormality in the closed loop control circuit, and wherein the phase control unit generates a switching signal to decrease an ability of the phase comparator to detect the abnormality when the phase of the motor synchronizing signal is sharply changed.

5. The color image forming apparatus according to claim 4, wherein the closed loop control circuit further outputs an encoded signal indicating a rotational phase of the polygon motor, and the phase control unit controls generation of the switching signal based on detecting a coincidence in phase of the motor synchronizing signal and the encoded signal.

6. The color image forming apparatus according to claim 1, wherein the closed loop control circuit includes a switch for switching the closed loop control circuit from a closed loop state to an open loop state, and wherein the phase control unit generates a switching signal to control the switch to place the closed loop control circuit in the open loop state when the phase of the motor synchronizing signal is sharply changed.

7. The color image forming apparatus according to claim 6, wherein the closed loop control circuit further outputs an encoded signal indicating a rotational phase of the polygon motor, and the phase control unit controls generation of the switching signal based on detecting a coincidence in phase of the motor synchronizing signal and the encoded signal.

8. The color image forming apparatus according to claim 1, wherein the closed loop control circuit includes an adder/subtracter, and wherein the phase control unit generates an add/subtract signal input to the adder/subtracter to change a value of the motor drive signal when the phase of the motor synchronizing signal is sharply changed.

9. The color image forming apparatus according to claim 8, wherein the closed loop control circuit further outputs an encoded signal indicating a rotational phase of the polygon motor, and the phase control unit controls generation of the add/subtract signal based on detecting a coincidence in phase of the motor synchronizing signal and the encoded signal.

10. A color image forming apparatus comprising:

photosensitive means;

latent image forming means for forming a plurality of sequential images of respective colors on the photosensitive means, and including a motor means for rotating a rotatable mirror means for deflecting an exposing beam to impinge on the photosensitive means;

intermediate transfer means to which the image formed on the photosensitive means is transferred;

detecting means for detecting a timing mark means on the intermediate transfer means;

closed loop control means for generating a motor drive signal for controlling rotation of the motor means;

phase control means for controlling the closed loop control means by inputting a motor synchronizing signal to the closed loop control means to control the motor drive signal, and for sharply changing a phase of the motor synchronizing signal to be synchronized with detecting the timing mark means without generating an abnormality in the closed loop control means.

11. The color image forming apparatus according to claim 10, wherein the closed loop control means includes an amplifier means with a variable gain, and wherein the phase control means generates a switching signal to reduce a gain of the amplifier means when the phase of the motor synchronizing signal is sharply changed.

12. The color image forming apparatus according to claim 11, wherein the closed loop control means further outputs an encoded signal indicating a rotational phase of the motor means, and the phase control means controls generation of the switching signal based on detecting a coincidence in phase of the motor synchronizing signal and the encoded signal.

13. The color image forming apparatus according to claim 10, wherein the closed loop control means includes a phase comparator means for detecting the abnormality in the closed loop control means, and wherein the phase control means generates a switching signal to decrease an ability of the phase comparator means to detect the abnormality when the phase of the motor synchronizing signal is sharply changed.

14. The color image forming apparatus according to claim 13, wherein the closed loop control means further outputs an encoded signal indicating a rotational phase of the motor means, and the phase control unit controls generation of the switching signal based on detecting a coincidence in phase of the motor synchronizing signal and the encoded signal.

15. The color image forming apparatus according to claim 10, wherein the closed loop control means includes a switch means for switching the closed loop control means from a closed loop state to an open loop state, and wherein the phase control means generates a switching signal to control the switch means to place the closed loop control means in the open loop state when the phase of the motor synchronizing signal is sharply changed.

16. The color image forming apparatus according to claim 15, wherein the closed loop control means further outputs an encoded signal indicating a rotational phase of the motor means, and the phase control means controls generation of the switching signal based on detecting a coincidence in phase of the motor synchronizing signal and the encoded signal.

17. The color image forming apparatus according to claim 10, wherein the closed loop control means includes an adder/subtracter means, and wherein the phase control means generates an add/subtract signal input to the adder/subtracter means to change the motor drive signal when the phase of the motor synchronizing signal is sharply changed.

18. The color image forming apparatus according to claim 17, wherein the closed loop control means further outputs an encoded signal indicating a rotational phase of the motor means, and the phase control means controls generation of the add/subtract signal based on detecting a coincidence in phase of the motor synchronizing signal and the encoded signal.

* * * * *